United States Patent [19]

Kadlec et al.

[11] Patent Number: 5,254,368
[45] Date of Patent: Oct. 19, 1993

[54] PERIODIC CHEMICAL PROCESSING SYSTEM

[75] Inventors: Robert H. Kadlec, Chelsea, Mich.; Garo G. Vaporciyan, Houston, Tex.

[73] Assignee: University of Michigan, Ann Arbor, Mich.

[21] Appl. No.: 927,242

[22] Filed: Aug. 7, 1992

Related U.S. Application Data

[63] Continuation of Ser. No. 662,492, Feb. 27, 1991, abandoned, which is a continuation of Ser. No. 441,187, Nov. 22, 1989, abandoned, and Ser. No. 116,092, Nov. 2, 1987, abandoned.

[51] Int. Cl.$^5$ .............................................. B01J 8/00
[52] U.S. Cl. ........................................ 423/247; 423/75; 95/103
[58] Field of Search .................. 55/58, 75; 423/247, 423/437, 75

[56] References Cited

U.S. PATENT DOCUMENTS

| | | | |
|---|---|---|---|
| 2,968,533 | 1/1961 | Lichtenwalter | 423/210 R |
| 3,864,452 | 2/1975 | Chi et al. | 55/58 |
| 4,023,939 | 5/1977 | Juntgen et al. | 55/73 |
| 4,054,428 | 10/1977 | Foltz | 423/247 |
| 4,194,891 | 3/1980 | Earls et al. | 55/26 |
| 4,194,892 | 3/1980 | Jones et al. | 55/58 |
| 4,280,824 | 7/1981 | Lassmann et al. | 55/74 |
| 4,406,674 | 9/1983 | Knoblauch et al. | 55/58 |
| 4,444,572 | 4/1984 | Avon et al. | 55/74 |
| 4,702,903 | 10/1987 | Keefer | 55/68 |

FOREIGN PATENT DOCUMENTS

| | | | |
|---|---|---|---|
| 56-44044 | 4/1981 | Japan | 423/437 |
| 62-65920 | 3/1987 | Japan | 423/247 |
| 1298242 | 3/1987 | U.S.S.R. | 423/247 |

OTHER PUBLICATIONS

Turnock, et al., "Separation of Nitrogen and Methane Via Periodic Adsorption," *AIChE Journal*, vol. 17, No. 2, pp. 335-342 (Mar. 1971).

Kowler et al., "The Optimal Control of a Periodic Adsorber," *AIChE Journal*, vol. 18, No. 6, pp. 1207 to 1219 (Nov. 1972).

*Primary Examiner*—R. Bruce Breneman
*Attorney, Agent, or Firm*—Rohm & Monsanto

[57] ABSTRACT

Integral coupling of reaction with a single-bed rapid cycle pressure swing adsorber provides a hybrid device having improved performance characteristics including better separation and more efficient reactions. A single packed bed containing a mixture of catalyst and adsorbent is featured. Gaseous reactants are fed into the bed in a sequence including inflow, relax, and backflow, portions. The hybrid device, designated as a periodic separating reactor (PSR), enhances both the total conversion and selectivity of reactions. In an illustrative example with respect to CO oxidation, conversion 2.5 times that typically exhibited for the corresponding steady-state plug flow reactors was observed. The separation performance (selectivity) of the hybrid device/process can be enhanced, illustratively for irreversible reaction systems, up to $10^4$ times that possible in pressure swing adsorption processes without reaction. The particular exit stream in which a component is enriched is a function of reaction rates, feed composition, adsorption capacities, delivery flow rate, and the feed fraction of the process cycle. Separation between reaction components, local reduction of reactant partial pressures, changes in the residence time distribution, and the nature of the reaction rate law contribute to the observed process performance. A modeling scheme is proposed to describe the behavior of the hybrid device and the expected results from application of the process to any particular reaction.

3 Claims, 13 Drawing Sheets

PERIODIC CHEMICAL PROCESSING SYSTEM

This application is a continuation of application Ser. No. 662,492 filed Feb. 27, 1991, now abandoned, as a continuation of application Ser. No. 441,187, filed Nov. 22, 1989, now abandoned, and Ser. No. 116,092 filed Nov. 2, 1987, now abandoned.

BACKGROUND OF THE INVENTION

This invention relates generally to systems for gas phase chemical processes, and more particularly, to a system coupling a periodic separation process with chemical reaction.

The use of pressure swing adsorption processes to effect separation of gas mixtures of the type having selectably adsorbable components is well known. In known systems, the discharge product gas is not continuous, and therefore, a plurality of adsorbent beds are provided in parallel with one another to achieve a measure of continuity in the product output flow. In the separation process of each adsorption bed at least one selectable component of the feed gas mixture is adsorbed so that the gas discharged at the other end of the adsorption bed is the component-depleted product gas. Generally, such adsorption occurs at the highest pressure of the process which is generally the input feed pressure. This high pressure portion of the separation process cycle is followed by a depressurization portion of the cycle wherein the gas within the adsorption bed is reversed in its direction of flow and released at the inlet end of the adsorption bed. The gas which is thus exhausted is rich with the desorbate, which corresponds to the component of the feed gas which had been adsorbed and is released upon reduction in the pressure. In certain known systems, the depressurized exhaust portion of the cycle is followed by introduction of a purge gas at the product outlet end of the adsorption. A new cycle is commenced with the introduction once again of pressurized feed gas after purging has been completed.

The prior art has recognized that multiple adsorption bed systems are plagued with various significant disadvantages. For example, in addition to the requirement of multiple adsorption beds, substantial complexity and expense is required in the interconnecting piping and valving system. Additionally, such multiple adsorption bed systems require long cycle periods. Moreover, such systems achieve only unacceptably low utilization, or productivity, of the adsorbent.

The prior art has attempted to mitigate some of the problems associated with multiple bed adsorption systems by providing the rapid pressure swing adsorption process (RPSA). A significant difference between the pressure swing adsorption system (PSA) as described hereinabove with multiple adsorption beds and RPSA, is that RPSA utilizes a higher flow resistance in the adsorbent bed as a result of packing the bed with small adsorbent particles.

PSA, in contrast, minimizes the flow resistance and thereby operates with reduced pressure drop across the adsorption bed. The flow of feed gas at a first pressure, which is typically the highest pressure applied to the adsorbent bed during the process cycle, continues for a predetermined portion of the overall process cycle; and during that time, a product gas is issued at the other end of the adsorbent bed. The product gas corresponds to the feed gas which has been depleted by a gas component which has been adsorbed in the adsorbent bed.

During a second portion of a product cycle, the inletting of pressurized feed gas is discontinued and an exhaust valve is opened. The exhaust valve is located at the feed end of the adsorbent bed. This results in a significant decrease in the gas pressure at the adsorbent bed, and therefore the adsorbed component gas is released. This phenomenon, which is now well known after its discovery by one of the inventors herein, essentially involves the correlation that the capacity of the adsorbent bed increases with pressure or temperature. Thus, desorption occurs when the pressure is reduced. During this period of pressure reduction, the component-depleted gas flows in the opposite direction from the feed gas flow, toward the exhaust valve. This reverse-flowing gas is therefore rich in the adsorbed component gas, and may itself be a usable gas.

The foregoing is but one of the many operations which have been studied in the prior art under controlled cyclic operation. It is noteworthy that the various operations of such cyclic systems cannot be analyzed in a steady state context. The pulsed operations utilize repetitive parameter changes, such that the system behavior remains transient notwithstanding a cyclic steady state. It is now known, however, that cyclic operation results in improved efficiency and increases throughput for such processes as absorption, extraction, crystallization, ion exchange, reaction, distillation, adsorption, and particle separation. These results are particularly apparent in mass production cyclic reactors including catalytic converters and gas heating furnaces.

The prior art has generally concentrated on either separation or reaction processes. Several approaches have been employed to achieve cyclic operations, the most common being the cycling of a thermodynamic variable which effects separation. Such thermodynamic variables include temperature, concentration, electric fields, pH, and pressure. Separation processes of this nature depend upon the cyclic variation of the distribution coefficient for a solute between phases. One phase acts as a capacitor, alternately storing and losing solute to the other phase involved. In some cyclic separation schemes, such as parametric pumping and pressure swing adsorption, the process includes a flow reversal which is coupled to a change in a thermodynamic variable.

Reactor performance is known to be altered by cyclic operation for any nonlinear process. For heterogeneous catalytic gas phase reactors, surface rate processes, such as adsorption diffusion, surface reaction, and desorption, are influenced by periodic operation, even to the point of changing the dominating reaction mechanism. Generally, the feed concentration and the reactor temperature are the variables which are cycled.

It is an object of this invention to provide a periodic chemical processing system wherein both, reaction and separation, are achieved in a single bed.

It is another object of this invention to provide a system wherein the cyclic separation process of pressure swing adsorption is combined with a cyclic reaction process.

It is a further object of this invention to provide a periodic chemical processing system wherein the cycling of feed pressure, temperature and/or concentration is combined with the internal distribution of an adsorbent for separation and a catalyst to facilitate reaction.

It is also an object of this invention to provide a periodic chemical processing system wherein reaction of components in the system varies the adsorption behavior of the gaseous components to increase adsorption of a selectable one, and hence, to create better selectivity than obtainable with known systems.

It is additionally an object of this invention to provide a system which operates substantially in accordance with a reaction-rate limited model given herein so that the effect of variations in process parameters can be predicted.

It is still another object of this invention to provide a periodic chemical processing system wherein the separation mode can be altered to permit control of which exit stream will contain the desired component.

It is an additional object of this invention to provide a periodic chemical processing system wherein costs are reduced by elimination of the need of multiple separators.

It is still a further object of the invention to combine a continuous cyclic separation process with a periodically operated reactor.

It is a yet further object of this invention to provide a periodically-operated heterogeneous catalytic reactor-adsorber.

SUMMARY OF THE INVENTION

The foregoing and other objects are achieved by this invention which provides in a first aspect thereof an apparatus of the type having a column with first and second ends, the first end having a first inlet and a first outlet, and the second end having a second outlet. In accordance with the invention, the apparatus is provided with a packing material formed of a combination of an adsorbent and a catalyst, arranged in the column for communicating with a feed gas which is introduced under pressure.

In one illustrative embodiment, the adsorbent and the catalyst which comprise the packing material are arranged in respective ones of first and second zones within the column. The second zone, which contains the catalyst, may also be provided with a further catalyst support or adsorbent. In addition, the second end of the column in the vicinity of the second outlet, may be advantageously provided with a reflux storage volume for the discharged product gas. In those embodiments having such a storage volume, the gas which is stored therein can be returned to the adsorption bed during the reverse flow exhaust portion of the process cycle.

In accordance with a process aspect of the invention, first and second reactants are supplied to a packed bed whereby the reactants are subjected to an adsorbent, such as a microsieve or activated carbon, in the packed bed. Additionally, the reactants are subjected to a catalyst in the packed bed. The reactants are therefore reacted in the presence of the catalyst to form a gaseous product.

In accordance with the invention, the reactants are introduced into the packed bed as a gas mixture at a predetermined pressure during a predetermined feed portion of the cycle process. However, in other embodiments, the reactants are introduced into the packed bed during respective sequential feed portions of the cycle process. In such an embodiment, separate inlets are provided for the various reactants, the reactants being introduced as complementary alternating gas pulses.

The packed bed which is formed of an adsorbent such as adsorptive pellets of a microsieve. The adsorptive microsieve may also be arranged in a predetermined adsorption zone of the packed bed. In this manner, a contaminant which could deleteriously affect the catalyst could be adsorbed in the microsieve, and later desorbed during an exhaust or purge cycle. Since desorption and purging occur in a direction opposite to that of the initial feed, the contaminant is effectively kept away from the catalyst. In order to facilitate pressure equalization in the packed bed, a time delay may be interposed between the adsorbing and desorbing cycle portions. There would therefore be a delay from the time that the pressurized feed is discontinued to the time that the exhaust portion of the process cycle is commenced.

Advantageously, the invention with a single bed enables the production of two streams of "product": reactant or delivery product and exhaust product which may be a reactant product or the unreacted reactants or contaminants. Prior art processes, constrained by thermodynamics, are limited in the achievable conversions and yields because there is only one product stream. The ability of the system of the present invention to produce two product streams, coupled with control of process parameters as set forth hereinbelow, permits higher conversions than heretofore possible.

Specific examples of various reactions (reversible, irreversible, single and multiple products, and single and multiple reactions) are given herein in the context of only one operating region, i.e., isothermal, reaction-rate limited for constant feed composition. However, it is to be understood that the process may be employed in other operating regions.

BRIEF DESCRIPTION OF THE DRAWING

Comprehension of the invention is facilitated by reading the following detailed description in conjunction with the annexed drawing, in which.

DETAILED DESCRIPTION

The effect of a repetitive discontinuity on an otherwise continuous chemical operation has been found to be beneficial. For separation processes these benefits have been reported by the prior art as increased stage efficiency and throughput. For reaction processes, beneficial interactions between the various thermodynamic parameters during cyclic operation can lead to increased driving forces, nonlinear dynamics, chromatographic effects, and promotion of reaction mechanisms not normally active during steady-state operation.

Figure 1:
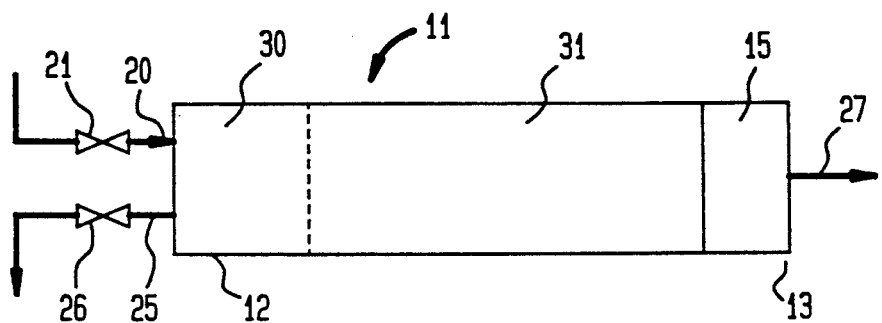
FIG. 1 is a schematic representation of a specific embodiment of a periodic separating (PSR) constructed in accordance with the principles of the invention.

FIG. 1 is a schematic representation of a periodic separating reactor 10 constructed in accordance with the principles of the invention. The periodic separating reactor of the present invention combines the cyclic separation process of pressure swing adsorption and a cyclic reaction process. It is to be understood that although the discussion herein is directed to a single bed, the hybrid device of the present invention can function in the context of a multi-bed or rotational system. Persons of skill in the art can produce embodiments of the type mentioned herein, as well as others, in light of the present disclosure.

Periodic separating reactor 10 is formed of a bed or column 11 having a first end 12 and a second end 13. Advantageously, a reflux void volume 15 is arranged at second end 13 of the column.

The first end of the column has coupled thereto a feed inlet 20 which is controlled by a feed valve 21. Additionally, the first end of the column has an exhaust outlet 25 controlled by an exhaust valve 26. The second end of the column has a product outlet 27 from which will be issued a product gas during operation of the periodic separating reactor.

Figure 2:
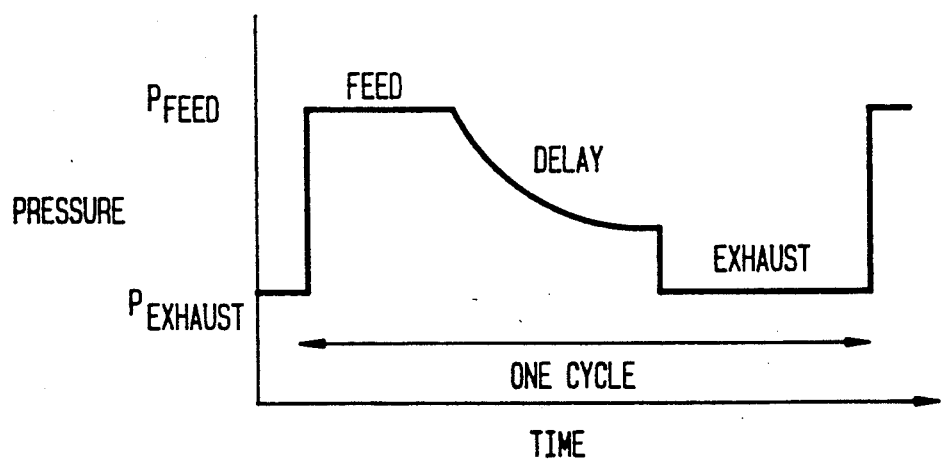
FIG. 2 is a representation of the characteristic of the inlet pressure wave form.

FIG. 2 is a graphical representation of a pressure cycle at feed inlet 20 of the periodic separating reactor described hereinabove. The figure represents the amplitude of pressure at the inlet during the various indicated portions of the cycle of the periodic separating reactor. The periodic separating reactor is constructed and operated like a single-bed pressure swing adsorber. The gaseous reactants are pumped into the packed bed under high pressure for a fraction of the operating cycle. As indicated hereinabove, the column of the periodic separating reactor is packed with a combined catalyst/adsorbent. After the input gaseous reactants are admitted into column 11 via the feed valve 21, the valve 21 is closed and a time delay is interposed before exhaust valve 26 is opened. During the delay, the pressure within the column begins to equalize such that a continuous stream of product gas is removed at product outlet 27. Clearly, such equalization of the pressure in column 11 during the delay period shown in FIG. 2 occurs from the inlet at valve 21 which is at higher pressure, toward product outlet 27. However, also as shown in FIG. 2, immediately upon the opening of exhaust valve 26, the pressure at the inlet side of the column drops to $P_{exhaust}$, which is nevertheless higher than atmospheric pressure, but as discussed herein, low enough to cause desorption from adsorption zone 30. Thus, a product stream containing desorbed components is exhausted out of exhaust valve 26. As will be described hereinbelow in greater detail, the stream exhausted out of the exhaust valve flows simultaneously with the continuous product stream flowing out of product outlet 27, and in the opposite direction thereto. Reflux void volume 15 allows for reflux and higher product purity.

After a start-up period consisting of many cycles, a stationary (repetitive) cyclic-steady-state is reached, with periodically varying pressure and composition existing within the column. The chemical conversion which is accomplished within the column depend on, among other variables, the manner in which pressure and reactant concentrations are controlled at the feed boundary.

In this specific illustrative embodiment, column 11 is shown in FIG. 1 to have a first portion, in the vicinity of first end 12, containing an adsorbent 30. A second portion, intermediate of adsorbent 30 and second end 13 is packed with catalyst 31. In certain embodiments, the catalyst 31 may include a support which may itself be an adsorbent. Adsorbent 30 may be different from an adsorbent material in the catalyst 31. Adsorbent 30 may be used to eliminate contaminants from the feed gas which would otherwise have a deleterious effect on catalyst 31. During the exhaust portion of the cycle, the reduction in column pressure would cause desorption of the contaminant from adsorbent packing 30 and a reverse gas flow out of the column via exhaust outlet 25.

It is to be understood, however, that the bed packing material can comprise any combination of adsorbent and catalyst in a homogeneous or heterogeneous mixture, or any combination thereof disposed in discrete zones along the length of the bed. The particular catalyst and/or adsorbent chosen would be reaction-dependent. Examples of appropriate materials for various types of reactions are well known to persons of ordinary skill in the art. In a particularly advantageous embodiment of the invention, an "egg shell" configuration wherein the catalyst is deposited on the surface of a support, provides sufficient assistance to the reaction and is economical insofar as the amount of precious metal catalyst required is minimized.

The periodic separating reactor has no steady-state analogue and, thus, cannot be described in the context of steady-state theory. Modeling of separating reaction systems has taken the approach of considering the separation portion of the process at local equilibrium while employing a macroscopic law for the determination of reaction rates. Modeling of periodically operated heterogenous reactors has focussed on rate improvements based on the adsorption-desorption phenomena and nonlinear interactions of the catalyst surface. Some modeling schemes have further included the presence of inactive or additional surface species, poisoning, cluster islands, surface diffusion, coverage dependent changes in the catalyst or other nonlinearities and complications.

For the periodic separating reactor of the present invention, even when adsorption and desorption rate phenomena are considered to be at local equilibrium, heteregeneous surface concentrations are not constant with respect to time. Due to fluctuating pressures, modeling must include accumulation terms for both gas and solid phases, even at cyclic-steady-state. If local reaction rates are fast enough, local reaction equilibrium may be assumed. As with sorption equilibrium, local reaction equilibrium will vary cyclically. A perturbed equilibrium model has been investigated by the inventors herein and published in *AIChE J.*, p. 1334, August, 1987, the text of which is incorporated herein by reference. Previous work by one of the inventors herein has demonstrated that for pressure swing adsorption systems, the periodic process, at room temperature, is an adsorption equilibrium process. Thus, the model set forth herein, will retain the assumption of sorption equilibrium for the reaction-rate limited periodic separating reactor and relax the reaction equilibrium constraint from the perturbed equilibrium model previously reported by the inventors.

Consider a periodic separating reactor in which J reactions proceed involving N components. Formulation of a mathematical model begins with these simplifying assumptions:
1) Local sorption equilibrium.
2) Local reaction rates determined from gaseous partial pressures.
3) Isothermal operation.
4) No radial concentration and/or pressure gradients.
5) The process is not diffusion limited in any respect.
6) Ideal gas behavior.
7) Darcy's law for flow through packed beds.
8) Linear sorption isotherms.
9) Ideal solution behavior in the gas phase.
10) Perfect pressure response during feed/exhaust and exhaust/feed switches.
11) No variations in the feed concentration.
12) Well-mixed void volume at the delivery end of the reactor.
13) No void volume at the feed end of the packed bed.
14) Constant molar delivery stream flow rate.

Reference to Table 1 will facilitate an understanding of the symbols and notations used herein.

TABLE 1

| | Notation |
|---|---|
| A | Cross sectional area of the periodic separating reactor, cm$^2$. |
| f | Fraction of the process period. |
|   | Refers to a function. |
| J | Total number of reactions. |
| $K_{eq}$ | Reaction equilibrium constant, atm$^{\Delta v}$. |
|   | Permeability of the packed bed, gm cm/atm sec$^2$. |
| k | Forward reaction rate constant, . |
|   | Set of all reaction rate law parameters for a given reaction. |
| L | Length of the packed bed, cm. |
| N | The total number of components in the system. |
| P | Pressure, atm. |
| Q | Cycle average molar flow rate, mg moles/sec. |
| q | Molar flow rate thru the steady-state plug flow reactor, mg moles/sec. |
| R | Ideal gas constant, atm cm$^3$/mg mole °K. |
| S | Arbitrary reaction component. |
| T | Absolute temperature, °K. |
| t | Time into the cycle, sec |
| V | Volume, cm$^3$. |
| x | Distance down the packed column from the feed point, cm. |
| Z | Dimensionless pressure, P/P$_f$. |
| α | Constant in the linear adsorption isotherm, mg moles/atm gm ads. |
| β | Reaction rate order in a forward reaction expression. |
| γ | Dimensionless bed capacity, defined in equation 2. |
| Δv | Net change in total moles due to reaction. |
| ε | Porosity of the packed bed. |
| θ | Dimensionless time, t/τ. |
| λ | Dimensionless length down the packed bed, x/L. |
| μ | Average viscosity of the gases, gm/cm sec. |
| ρ | Density of the adsorbent or catalyst, gm/cm$^3$. |
| σ | Reaction rate order in a reverse reaction expression. |
| υ | Stoichiometric coefficient of the subscripted chemical component. |
| τ | Cycle period, sec. |
| Subscripts | |
| A | Refers to the adsorbent. |
| C | Refers to the catalyst. |
| D | Refers to the delay part of the cycle. |
| d | Refers to the deliery stream. |
| e | Refers to the exhaust stream or part of the cycle. |
| ex | Refers to the exit of the steady-state plug-flow reactor. |
| f | Refers to the feed stream or part of the cycle. |
| i | Refers to the i$^{th}$ chemical component of the N present. |
| j | Refers to the j$^{th}$ reaction of the total present. |
| l | Refers to the reference component for the particular reaction. |
| min | Refers to the minimum dimensionless pressure, P$_e$/P$_f$. |
| R | Refers to the reflux void volume. |

A single reaction (of the J present) has the form: $\Sigma v_i S_i = 0$. The state equations may be formed from conservation laws and thermodynamics. After being made dimensionless, a mole balance for each of the N components leads to the following set of equations:

$$\left(\frac{\tau P_f k}{\mu L^2}\right)\frac{\partial}{\partial \lambda}\left(Z_i \frac{\partial Z}{\partial \lambda}\right) + \frac{r_i \rho_c R T \tau}{P_f} = \gamma_i \frac{\partial Z_i}{\partial \theta} \quad (1)$$

for $i = 1, 2, \ldots N$ where the dimensionless capacity is:

$$\gamma_i = \epsilon + \rho_A R T \alpha_i \text{ for } i = 1, 2, \ldots N \quad (2)$$

and the total dimensionless pressure is determined from:

$$Z = \sum_{i=1}^{N} Z_i \quad (3)$$

The net reaction rate for each component is:

$$r_{ji} \nu_{ji} = r_{jl} \nu_{jl} \text{ for } j=1,2,\ldots J, \; i=1,2,\ldots N \quad (4)$$

where $l$ is the reference component for reaction $j$. Stoichiometry yields:

$$r_i = \sum_{j=1}^{J} r_{ji} \quad (5)$$

for $i = 1,2,\ldots N$

The rate law for each reaction would take the form, $$r_{jl} = r_j = f(Z_i, k) \text{ for } j=1,2,\ldots J \quad (6)$$

For the general case presented herein, rate laws are assumed to follow the elementary homogeneous reaction expression:

$$r_{jl} = k_j P_f^{\beta j} \prod_{i=1}^{N} Z_i^{\beta ji} - \frac{k_j}{K_{eqj}} P_f^{\sigma j} \prod_{i=1}^{N} Z_i^{\sigma ji} \quad (7)$$

for $j = 1,2,\ldots J$

The above $(3N+JN+J+1)$ state equations (1–7) form the basis of the model, along with time and boundary conditions, and reflux void volume conservation balances.

For the reflux void volume the following equations apply: when flow is from the packed bed into the reflux void volume, the following mole balance applies:

$$\text{when } \left.\frac{\partial Z}{\partial \lambda}\right|_{\lambda=1} < 0 \quad (8)$$

then for $i = 1,2,\ldots N$ $$\frac{\partial Z_{Ri}}{\partial \theta} = -\left(\frac{\tau P_f k}{\mu L^2}\right)\left(\frac{AL}{V_R}\right) Z_i \left.\frac{\partial Z}{\partial \lambda}\right|_{\lambda=1} - \left(\frac{Q_d RT \tau}{P_f V_R}\right)$$

During reflux, for flow from the void volume into the packed bed, $$\text{when } \left.\frac{\partial Z}{\partial \lambda}\right|_{\lambda=1} \geq 0 \quad (9)$$

then for $i = 1,2,\ldots N$ $$\frac{\partial Z_{Ri}}{\partial \theta} = -\left(\frac{\tau P_f k}{\mu L^2}\right)\left(\frac{AL}{V_R}\right) Z_{Ri} \left.\frac{\partial Z}{\partial \lambda}\right|_{\lambda=1} - \left(\frac{Q_d RT \tau}{P_f V_R}\right)$$

As always a mole fraction constraint exists, resulting in:

$$Z_R = \sum_{i=1}^{N} Z_{Ri} \quad (10)$$

For any feed boundary pressure control and delivery flow rate, the system is thus defined.

Boundary conditions for the packed bed are:
(1) At the feed end, $\lambda=0$, during the feed portion of the cycle (from $\theta=0$ to $\theta=f_f$), $$Z(0,\theta)=1., \; Z_i(0,\theta)=Z_{f,i} \text{ for } i=1,2,\ldots N \quad (11)$$

(2) during the delay portion of the cycle (from $\theta=f_f$ to $\theta=f_f+f_D$), and $$\left.\frac{\partial Z}{\partial \lambda}\right|_{\lambda=0} = 0 \quad (12)$$

(3) during the exhaust portion of the cycle (from $\theta=f_f+f_D$ to $\theta=1$), $$Z(0,\theta)=Z_{min} \quad (13)$$

At the delivery end, $l=1$, during reflux into the packed bed from the void volume, $$\text{when } \left.\frac{\partial Z}{\partial \lambda}\right|_{\lambda=1} > 0 \text{ then,} \quad (14)$$

$$Z(1,\theta) = Z_R(\theta), \; Z_i(1,\theta) = Z_{R,i}(\theta)$$

for $i = 1,2,\ldots N$

The above set of equations describes transients in reaction-rate limited periodic separating reactors.

Cyclic-steady-state is achieved when the conditions within the packed bed and reflux volume repeat every cycle. The periodic conditions are:

$$Z(\lambda,\theta)=Z(\lambda,\theta+1), \; Z_i(\lambda,\theta)=Z_i(\lambda,\theta+1) \text{ for } i=1,2,\ldots N \quad (15)$$

$$Z_R(\theta)=Z_R(\theta+1), \; Z_{R,i}(\theta)=Z_{R,i}(\theta+1) \text{ for } i=1,2,\ldots N \quad (16)$$

The total dimensional cycle average feed rate is calculated from:

$$Q_f = \left(\frac{ALP_f}{\tau RT}\right)\left(\frac{\tau P_f k}{\mu L^2}\right)\int_{0.}^{f_f} \left.\frac{\partial Z}{\partial \lambda}\right|_{\lambda=0} d\theta \quad (17)$$

While individual component feed rates are determined from:

$$Q_{f,i} = \left(\frac{ALP_f}{\tau RT}\right)\left(\frac{\tau P_f k}{\mu L^2}\right) Z_{f,i} \int_{0.}^{f_f} \left.\frac{\partial Z}{\partial \lambda}\right|_{\lambda=0} d\theta \quad (18)$$

for $i = 1,2,\ldots N$

The total dimensional cycle average exhaust rate is calculated from:

$$Q_e = \left(\frac{ALP_f}{\tau RT}\right)\left(\frac{\tau P_f k}{\mu L^2}\right) Z_{min} \int_{f_f+f_D}^{1.} \left.\frac{\partial Z}{\partial \lambda}\right|_{\lambda=0} d\theta \quad (19)$$

While the individual component exhaust rates are determined from:

$$Q_{\theta,i} = \left(\frac{A L P_f}{\tau RT}\right)\left(\frac{\tau P_f k}{\mu L^2}\right)\int_{f_f+f_D}^{1.} Z_i \frac{\partial Z}{\partial \lambda}\bigg|_{\lambda=0} d\theta \quad (20)$$

for $i = 1, 2, \ldots N$

Although the delivery molar flow rate is constant during a cycle and equal to $Q_d$, individual component delivery flow rates are determined from:

$$Q_{d,i} = \int_{0.}^{1.} Z_{R,i} d\theta \quad (21)$$

for $i = 1, 2, \ldots N$

The resulting reaction-rate limited model contains N second order, nonlinear, partial differential equations, along with (2N+JN+J+1) algebraic equations of which up to J algebraic equations may be nonlinear. The boundary conditions are time and state dependent, and include ordinary differential equations. In general, substitution can reduce the system by the algebraic equations.

Examination of the model reveals four classes of qualities:

Independent Variables: Dimensionless length down the reaction, $\lambda$, (0 at the feed end, 1 at the reflux void volume end), dimensionless cycle time, $\theta$, (0 at the start of a cycle, 1 at the end.)

Design Parameters: Feed pressure, exhaust pressure, delivery flow rate, cycle time, feed fraction of the process period, delay fraction of the process period, feed composition, reflux void volume, length of the reactor, temperature, cross crosssectional area, and the type, size and loading of catalyst and adsorbent.

Physical Parameters: Dimensionless groups and constants for the linear isotherms and Darcy's law, reaction rate constants, reaction equilibrium constants, reaction stoichiometry, packing void volume, and viscosity.

Dependent Variables: Dimensionless pressures, Z and $Z_R$, and partial pressures, $Z_i$ and $Z_{R,i}$ in both the PSR and reflux void volume.

These form into nine dimensionless parameters which characterize the reaction-rate limited PSR shown in TABLE 2.

TABLE 2

Dimensionless Groups and Parameters for the Reaction-Rate Limited Periodic Separating Reactor Model.

Dimensionless Groups
PSR "Damkohler" Number $[k_j P_f^{(\beta j-1)} \rho_c RT\tau]$ for $j = 1, 2, \ldots J$, Dimensionless Equilibrium Constant $$\left[\frac{P_f^{(\sigma j-\beta j)}}{K_{eq,j}}\right] \text{ for } j = 1, 2, \ldots J,$$

Dimensionless Capacity
$(\epsilon + \rho_A RT\alpha_i)$,

Pressure Ratio $$\left(\frac{P_e}{P_f}\right),$$

Cycle Time/Reflux Residence Time Ratio

TABLE 2-continued

Dimensionless Groups and Parameters for the Reaction-Rate Limited Periodic Separating Reactor Model.

$$\left(\frac{Q_d RT\tau}{P_f V_R}\right),$$

Cycle Time/Plug Flow Residence Time Ratio $$\left(\frac{\tau P_f k}{\mu L^2}\right),$$

Volume Ratio $$\left(\frac{V_R}{A L}\right),$$

Dimensionless Parameters
$f_f, f_D,$ and $[Z_{f,i}]$ for $i = 1, 2, \ldots N$

The PSR Damköhler number is the ratio of the cycle time to the characteristic reaction time. It relates to the classical Damköhler number for conventional reactors except that reactor residence time is replaced by process cycle period. The pressure dependency of the reaction equilibrium is apparent in the dimensionless equilibrium constant. The dimensionless capacity is pressure independent due to the linear sorption isotherm employed in the model. The exhaust to feed pressure ratio defines yet another dimensionless group. The next two dimensionless groups are ratios of time constraints. The first relates the cycle period to the residence time of the reflux void volume with a throughput of $Q_d$ at the feed pressure. The second ratio relates the cycle period to the PSR residence time when operated as a plug-flow reactor with no packing and with the flow rate determined from Darcy's Law. The ratio of the reflux void volume to the PSR empty bed volume constitutes another dimensionless ratio. The feed and delay fractions of the process cycle and dimensionless component feed partial pressures (equal to feed mole fractions) complete the dimensionless parameters which describe the reaction-time limited PSR model. The dimensionless capacity, when divided by $\epsilon$, results in the capacity enhancement factor, $$\left(\frac{\epsilon + \rho_A RT\alpha_i}{\epsilon}\right)$$

for $i = 1, 2, \ldots N$

This factor relates the gas phase capacity for a component to the capacity of the combined gas solid mixture.

A dimensional analysis of the appropriate form of the state equations shows that if the dimensionless groups and parameters shown in Table 2 are not changed, for a particular reaction, the solution to the dimensionless state equations will not change. Therefore, there exists sets of parameter values which will result in the same extent of separation and reaction within the PSR.

The effect of a change in various parameters may be determined through the use of the dimensionless groups in Table 2. For example, if $(k/\mu)$ is changed to $(k/\mu)'$ the same solution will be maintained if the cycle period $\tau$ is changed by a factor of $(k/\mu)/(k/\mu)'$ while $Q_d$ and $p_c$ are changed by the inverse of this factor. For any solution of the dimensionless state equations where the dimensionless groups and parameters in Table 2 are kept constant, the exhaust and feed rates will change by the factor $$\left(\frac{A L P_f}{\tau R T}\right)$$

The variation $(k/\mu)$ which leads to a change in $\tau$ will thus change the exhaust and feed rates by the factor $(k/\mu)'/(k/\mu)$. Therefore, a variation in k or $\mu$, if accompanied by the appropriate change in $\tau$ and $p_c$, leads to the same separation, reaction and fraction of the feed gas recovered in each exit stream. This relationship holds for both reversible and irreversible reactions of any order. The throughput of the system, however, has been altered. The permeability and gas viscosity thus directly affect the throughput of the system but not the relationship between the fraction of feed gas recovered in the delivery stream, the separation, and the extent of reaction achieved.

and reaction achieved, without a change in either catalyst or adsorbent loadings.

An understanding of the features and advantages of the hybrid processor and method of operation of the present invention is facilitated by examining PSR performance in response to various physical and design parameters for irreversible, reversible and parallel mixed reactions for a single reactant. Physical parameters which can be varied include reaction stoichiometry, adsorbent coefficients and the PSR Damköhler number. The design variables include delivery flow rate, cycle period, feed pressure, and the delay and feed fractions of the process period. A small delivery flow rate was employed to provide maximum concentration effects. The base case operating conditions are shown in Table 3. These parameter values were employed in simulation runs unless otherwise stated. Results were evaluated based upon degree of separation, system throughput, dimensionless flow rates, product selectivity, and the extent of conversion.

TABLE 3

| Base Case Values for Dimensionless Groups and Varied Parameters | | | | | | |
|---|---|---|---|---|---|---|
| Dimensionless Group | $\left(\frac{\tau P_f^k}{\mu L^2}\right)$ | | $\left(\frac{Q_d R T \tau}{P_f V_R}\right)$ | $\left(\frac{AL}{V_R}\right)$ | | $\left(\frac{P_e}{P_f}\right)$ |
| Base Case Value | 2.099 | | 0.7398 | 13.11 | | 0.595 |
| Dimensionless Group | $\epsilon$ | $f_f$ | $f_D$ | Parameter | $P_f$, atm. | $\tau$, sec. |
| Base Case Value | 0.623 | 0.50 | 0.00 | Base Case Value | 1.6806 | 5.0 |
| For All Reactions | $Z_{f,i}$ | $\left(\frac{\epsilon + \rho R T \alpha_i}{\epsilon}\right)$ | | Dimensionless Group | | $\left[\frac{P_f^{(\sigma j - \beta j)}}{K_{eq,j}}\right]$ |
| Component | | | | | | |
| A | 0.05 | 1. or 10. | | | | |
| B | 0.00 | 36. | | For All Irreversible Reactions | | 0.00 |
| C | 0.00 | 1. | | For All Reversible Reactions | | 1.00 |
| Diluent | 0.95 | 3.693 | | | | |

Dimensionless analysis may also involve design parameters. A change in the bed length of a PSR unit from L to L' accompanied by changes in $\tau$, $Q_d$, $\rho_c$, and $V_R$ by the factors $(L/L')^2$, $(L'/L)$, $(L'/L)^2$, and $(L/L')$ respectively will result in a change in $Q_e$ by the factor $(L'/L)$ without affecting the separation and extent of reaction achieved. This result holds for any reaction order and for multiple reaction systems (even with mixed reaction orders). Interestingly, a longer PSR bed length increases catalyst productivity (in terms of throughput per gram of catalyst) while actually decreasing adsorbent productivity. Therefore an optimal packed bed length exists.

Variations which involve feed pressure are applicable for irreversible reactions described by arbitrary reaction order and reversible reactions with equal forward and backward overall reaction orders described by equation 7. Reversible reactions which have different overall reaction orders for the forward and reverse reactions are not amenable to such analysis. The affect of a variation in $P_f$ for multiple reaction systems may also be deduced from dimensionless analysis as long as each individual reaction within the system exhibits the same overall reaction order. An interesting result is that for second order reaction systems, increased feed pressure coupled with an increase in the frequency of cycle will result in the increase of the throughput capacity of the PSR system while retaining the degree of separation The separation factor is the ratio of mole fractions between the delivery and exhaust streams. Thus for ratios above one, that component is enriched in the delivery stream.

The system throughput is the cycle average flow rate (mg moles/sec) processed by the periodic separating reactor.

The cycle average dimensionless flow rate is the average flow rate for a stream during one cycle divided by the delivery flow rate.

Product selectivity is defined by the total conversion to all other products.

Irreversible Reactions

Three irreversible reaction systems were investigated: A→½B+¼C, A→B, and C←A→B. As the Damköhler number is increased, conversion of reactant A increases. The conversion-Damköhler number performance of the various cases may be placed into two groups: those for which the reactant is adsorbed and those in which it is not adsorbed (relative to the diluent). For a given value of the PSR Damköhler number, conversions are greater for reaction systems in which the reactant is not adsorbed. This result is a consequence of the reactant residence time distribution and local adsorption. The concept of a residence time distribution (RTD) within a PSR is intriguing, due to the existence of two exit streams and the effects of the various system parameters upon the RTD. Due to the fact that component A is fed at the exhaust end of the bed, the average residence time for the reactant will be shorter when adsorption takes place. The shorter residence time therefore leads to lower conversions.

As a consequence of the rate law employed, reduced gas phase concentration of the reactant due to local adsorption decreases the local reaction rate. Furthermore, the time the reactant spends in an adsorbed (nonreactive) state versus a gaseous (reactive) state is increased.

Another difference between the case where the reactant is adsorbed and where it is not is the variance in conversion-PSR Damköhler number performance between the different reactions within a group. This difference can be explained by the effect of the product(s) on the average residence time of the reactant. For a system with noncompetitive linear adsorption, the separation achieved within a RPSA (and thus the mean RTD) for a trace component which does not adsorb is independent of other trace components present. This is not the case for an adsorbed trace component. Thus, production of heavily adsorbed product B influences the separation and mean RTD. The greater the number of moles of adsorbed product B produced per mole of A reacted, the greater the total conversion at a given PSR Damköhler number. The greater the production of the adsorbed product, the less an adsorbed reactant would be enriched in the exhaust stream, thus increasing its mean RTD.

The separation performance of a PSR for the irreversible reaction systems can be characterized as follows: irrespective of the affinity of the reactant and products for the adsorbent, the reactant is always enriched to a greater degree in the exhaust stream for the entire range of Damköhler number. Furthermore, separation between the reactant and the products is enhanced when the reactant is adsorbed. Separations are also enhanced at higher Damköhler numbers.

An advantageous feature of the invention is the occurrence of separation reversals. As an example, in reaction systems in which the reactant A is not adsorbed, the reactant undergoes a separation reversal as the Damköhler number is increased, first being enriched in the delivery stream at low Damköhler values and then being enriched in the exhaust stream at larger values. Separation reversal is limited to the reactant for reaction systems in which the reactant is not adsorbed. Separation reversals occur only for the adsorbed product B when the reactant is adsorbed.

An understanding of the coupling between the reaction and separation performance of a PSR can be obtained by examining the mole fractions for each component in the reaction $A \rightarrow \frac{1}{2}B + \frac{1}{2}C$ as a function of the Damköhler number. At low values of the PSR Damköhler number, the conversion achieved is small, thus negligible amounts of products exist. As the PSR Damköhler number is increased, the total amount of reactant A decreases while additional product B and C are produced. At this intermediate level of Damköhler number significant amounts of the product are produced very near the delivery stream because of the low velocities (long holding times) near the delivery stream end of the PSR unit. This in turn results in the inability of the PSR unit to enrich the preferentially adsorbed product B in the exhaust stream. At higher values of the PSR Damköhler number the products are produced nearer the feed end of the PSR unit and thus the adsorbed product B undergoes a separation reversal and is found enriched in the exhaust stream. Finally, at very large Damköhler numbers complete reactant conversion is instantaneous.

Concentration at different lengths into the PSR bed for component A, B, and C, respectively, for the reaction $A \rightarrow \frac{1}{2}B + \frac{1}{2}C$ exhibits regions corresponding to the feed and exhaust portions of the cycle. Bed pressures increase during the feed portion of the period and decrease during the exhaust portion. The product B is removed from the gas phase as it is produced during the feed portion of the cycle and then released during the exhaust portion of the cycle. Enrichment occurs toward the feed end of the PSR. The opposite effect is observed for product C. Due to the lack of adsorption, accumulation is in the gas phase during the feed portion of the cycle and enrichment occurs towards the delivery end of the PSR.

The concentration profiles are somewhat different for the reactant. The step change in the inlet concentration of A is increasingly damped at greater distances into the bed due to the adsorption of the reactant and due to pressure transients. The very fast reaction rates for this case result in decreasing reactant concentration during the exhaust portion of the cycle. Reaction rates coupled with the RPSA separation result in almost four orders of magnitude difference in the concentration of A from the exhaust to delivery end of the packed bed.

Whether a component will undergo a separation reversal with increasing Damköhler number depends only upon the capacity enhancement factor for that component. The actual value at which the separation reversal will occur depends upon the capacity enhancement factors of other components. For each case where a separation reversal occurs as the Damköhler number is varied, a critical value of the Damköhler number is encountered where the separation factor is one. At this point there exists a balance between the separation and reaction performance of the device.

For the reactant, if adsorbed (to a greater degree than the diluent) a separation reversal with increasing Damköhler number will not occur. At low Damköhler numbers, the reactant will be concentrated in the exhaust stream; any reaction which occurs will only serve to increase the concentration profile in the present direction. On the other hand, if the reactant is not adsorbed, a separation reversal will occur. At low Damköhler values, separation controls and thus the reactant is enriched in the delivery system. Reaction will act to impose the opposite concentration profile, and therefore at some level of Damköhler number, the reactant will be concentrated in the exhaust stream.

A product, if not adsorbed (compared to the diluent) will not exhibit a reaction-induced separation reversal. For low Damköhler numbers, product is formed very near the delivery stream and thus is enriched at that end of the bed. Even at the limit of instantaneous conversion of the reactant, a nonabsorbent product will still be enriched in the delivery steam. At low conversions, the adsorbed product is concentrated in the delivery stream. At higher conversions, the product will be produced nearer the feed end of the bed, and thus the separation factor will approach one. At the limit of instantaneous conversion, enrichment of the adsorbed product would be in the exhaust stream resulting in a separation reversal. Higher conversions are necessary for separation reversal of the product when the reactant is not adsorbed as compared to a system where the reactant is adsorbed. For the same level of conversion, product will be produced nearer the delivery stream in the case where the reactant is not adsorbed.

Reversible Reactions

Three reversible reactions systems were investigated: $A \rightleftharpoons \frac{1}{2}B + \frac{1}{2}C$, $A \rightleftharpoons B$, and $C \rightleftharpoons A \rightleftharpoons B$. The effect of the PSR Damköhler number upon the percent total conversion of the reactant A may be placed into two groups: those for which the reactant is adsorbed and those in which it is not adsorbed.

As in the case of irreversible reactions, conversions are greater for reaction systems in which the reactant is not adsorbed for a given value of the PSR Damköhler number. If reactant is not adsorbed, the conversion goes through a local maximum, the value of which is greater than the equilibrium conversion possible in a conventional reactor. The higher conversions are not only a consequence of the different mean reactant residence time, but of the effect of adsorption on the reaction equilibrium. The conversion enhancement is solely a consequence of the reaction equilibrium shift.

The shift in reaction equilibrium phenomena can be easily explained. Product B in all of the systems described herein is preferentially adsorbed. Thus as a reaction proceeds, product B is removed from the gas phase by accumulation on the adsorbent. This shifts the reaction equilibrium further towards the product(s). Those systems in which the reactant is adsorbed would tend to experience a shift of the reaction equilibrium back towards the reactant. For the reaction system $A \rightleftharpoons \frac{1}{2}B + \frac{1}{2}C$, separation of the two products from one another also inhibits the reverse reaction.

Separation performance of a PSR for the reversible reaction systems between reactant and product are greater at low levels of conversion that high levels. With the exception of the reaction system: $A \rightleftharpoons \frac{1}{2}B + \frac{1}{2}C$, separation between all reaction components is eliminated at high Damköhler values. Separation reversal is present for the adsorbed product in all cases. Separation reversals are present for the non-adsorbed reactant in all but one reaction system ($A \rightleftharpoons \frac{1}{2}B + \frac{1}{2}C$) as reaction rates increase. In addition, the component which is enriched to the greatest degree in the exhaust stream depends upon the Damköhler number, with the reactant being favored at low Damköhler numbers and the adsorbed product at higher values.

If reactant A is adsorbed, the critical value of the Damköhler number where the separation factors of both the reactant and the adsorbed product are equal is always greater than the critical value of the Damköhler number where the separation factor of the adsorbed product equals one. The situation is reversed when the reactant is not adsorbed.

Although product B is preferentially adsorbed, it is seldom enriched in the exhaust system. Unlike what was found for irreversible reactions, a change in the adsorptive capacity of the bed for the reactant (relative to diluent capacity) does cause a separation reversal.

Coupling between the reaction and separation performance of a PSR for equilibrium reaction systems can be demonstrated by examining the mole fractions for each component in the reaction $C \rightleftharpoons A \rightleftharpoons B$ as a function of the Damköhler number. At low values of the PSR Damköhler number, very little product is formed and separation of the reactant is similar to prior art RPSA processes. As in the case of irreversible reactions, significant amounts of the products are produced very near the delivery stream. This results in the inability of the PSR unit to enrich the preferentially adsorbed product B in the exhaust stream. As the Damköhler number is increased, the total amount of reactant decreases as additional product is formed. As the products are produced closer to the feed end of the bed, additional product appears in the exhaust stream. At some intermediate level of Damköhler number the products are produced so near the feed end of the bed that they are enriched in the exhaust stream. The critical Damköhler number for separation reversal is lower for product B that for product C, because the adsorbent has a greater capacity for B.

Whether a component will undergo a separation reversal in a reversible reaction with increasing Damköhler number depends not only upon the capacity enhancement factor for that component but also that for all other components present in the system. For example, if the reactant is adsorbed less than at least one of the products, no separation reversal is observed. The exception is an adsorbed product, which will always undergo a separation reversal with increasing reaction rate.

Cyclic processing has been found to affect selectivities in multiple reaction systems. The separation and subsequent reaction equilibrium shift possible in a PSR unit can cause favorable selectivity changes. The conversion-Damköhler number performance for the parallel reversible system $C \rightleftharpoons A \rightleftharpoons B$ shows that conversion of the reactant to product B is greater than that to product C if component B is preferentially adsorbed.

Selectivity of component B is enhanced compared to conventional reactor operation, which would show no selectivity toward either product. Selectivity goes through a local maximum as PSR conversion increases. Second, the greatest selectivity is achieved when the PSR conversion surpasses the equilibrium conversion possible in a conventional reactor (66.67%). In addition, for the upper range of possible conversions, two levels of selectivity are possible depending upon the particular PSR Damköhler number.

The effect of the capacity enhancement factor of the reactant upon the selectivity of the reaction towards product B as a function of the PSR Damköhler number has a maximum value which is larger and occurs at a lower Damköhler numbers if the reactant is not adsorbed. Selectivities are greater for the parallel reversible system if the reactant is not adsorbed because of the equilibrium shift toward the adsorbed product as explained previously. A larger Damköhler number is necessary if the reactant is adsorbed due to the shorter residence time of the reactant.

Concentration at different lengths into the PSR for component B in the parallel reversible reaction $C \rightleftharpoons A \rightleftharpoons B$ has, of course, regions corresponding to the feed and exhaust portions of the cycle. Product B is removed from the gas phase as it is produced during the feed portion of the cycle and then released during the exhaust portion. Due to the flow velocities and relatively slow reaction rates, more product B is formed at the delivery end of the bed, and thus, enrichment occurs in the delivery stream.

There is a balance between the separation and reaction components of the PSR which result in the optimal selectivity of the reaction toward the product B. As bed pressures increase during the feed portion of the period, actual local capacity of the bed increases, even though the bed is at local sorption equilibrium. At the beginning of the cycle, the bed is already at equilibrium with the gas phase component B concentration at the end of the exhaust portion of the cycle. The optimal result is occasioned when production of B during the feed portion of the cycle exactly matches the increasing adsorptive capacity.

If reaction rates are too fast for the rate of additional adsorptive capacity being created, product B concentrations in the gas phase would increase during the feed portion of the cycle and thus the reverse reaction would be increased. If reaction rates are too slow compared to the rate of adsorptive capacity being formed, excess capacity would be present and thus the full potential of the unit would not be utilized. Although it might seem that slower reaction rates would favor product B selectivity, the increase in the time available for B to undergo the reverse reaction at lower reaction rates opposes the reaction equilibrium shift.

A Mixed Reversible-Irreversible Reaction System

The coupling of the reaction and separation components of a PSR for the mixed reversible-irreversible reaction system C ← A ⇌ B results in performance characteristics of both reversible and irreversible reactions. As with the completely reversible parallel reaction system, selectivity towards adsorbed product B is greater when the reactant is not adsorbed. Also, separation reversals are present for adsorbed product B. As with the completely irreversible parallel reaction system, very good separations are possible at higher conversions for the mixed reaction system. The separation reversal performance of the reactant also parallels the irreversible system.

Comparison of the conversion performance of the PSR to steady-state operation reveals that steady-state operation produces more of product B below about 87% total conversion of the reactant, while PSR operation can produce more of product B at greater total conversions. Therefore, the reaction equilibrium shift towards absorbed product B must be opposed by another factor. In a conventional idealized plug flow reactor, component B can reamin in the reactor up to one residence time. Within the PSR system, product B formed is carried back towards the exhaust and thus greater than one plug flow residence time exists for product B to back-react to A which in turn will proceed to increase the amount of C formed.

Higher selectivity towards product B would be desirable only at lower conversions. If product C is the desired product, a PSR offers not only greater selectivity but also allows separation of the product C from the other components in the system.

Referring specifically to the parallel reversible reaction system described hereinabove, (C ⇌ A ⇌ B) variations in design parameters, such as the dimensionless pressure ratio, delivery flow rate, total cycle time, feed fraction of the period, and the delay fraction of the period are illustrated in FIGS. 3–9. The base case PSR Damköhler number (11.65) was chosen as that resulting in an optimal conversion for the system with a period of five seconds.

Figure 3:
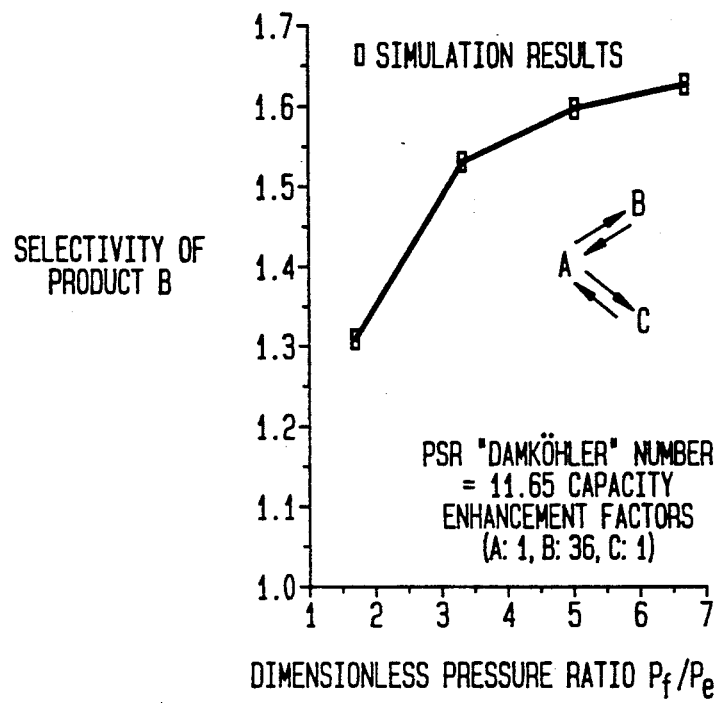
FIG. 3 is a graphical representation of the effect of feed pressure on adsorbed product selectivity for the reversible B $\rightleftarrows$ A $\rightleftarrows$ C reaction plotted as dimensionless pressure ratio versus selectivity of product B.
Figure 4:
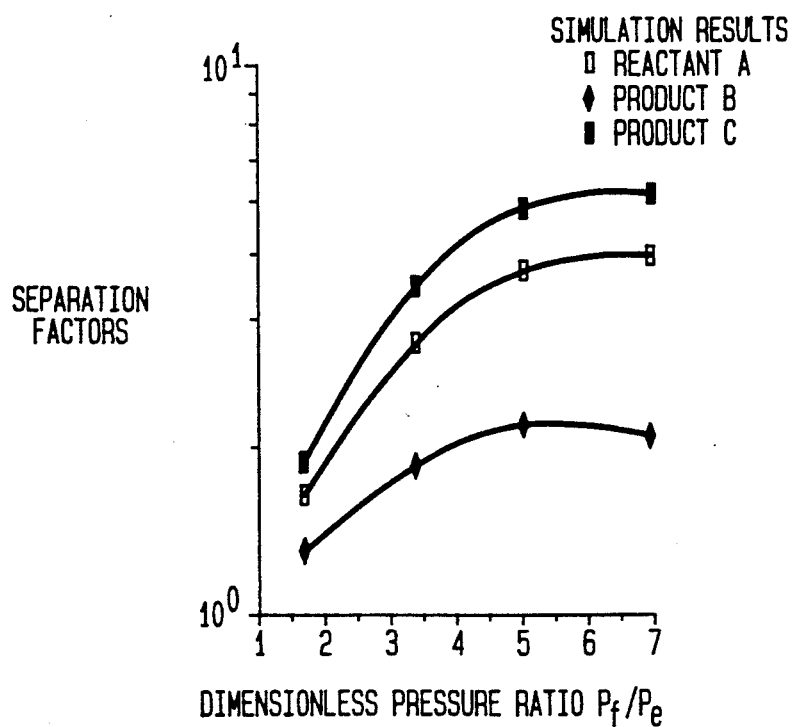
FIG. 4 is a graphical representation of the effect of feed pressure on PSR separation performance for the reversible B $\rightleftarrows$ A $\rightleftarrows$ C reaction plotted as dimensionless pressure ratio versus separation factors.
Figure 5:
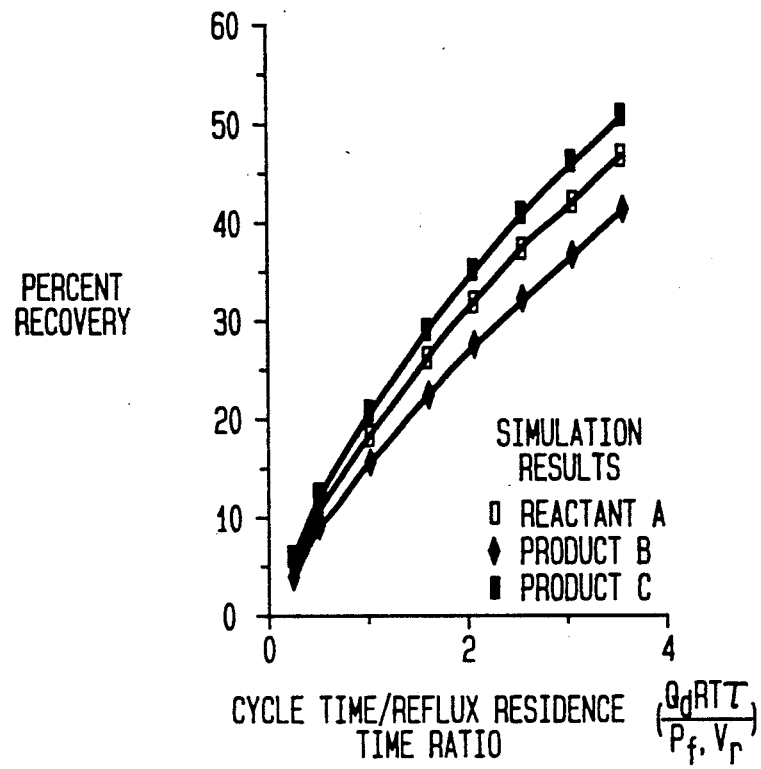
FIG. 5 is a graphical representation of the effect of delivery flow rate on percent recoveries in the dlivery stream for the reversible B $\rightleftarrows$ A $\rightleftarrows$ C reaction plotted as cycle time/reflux residence time ratio versus percent recovery.

The effect of the dimensionless pressure ratio $P_f/P_e$ upon the selectivity and separation achieved within a PSR is shown in FIGS. 3 and 4. As the dimensionless pressure ratio is increased, selectivity of the adsorbed product increases. A conventional reactor would show no selectivity towards either product. Total conversion of the reactant varies only slightly, increasing from 67% at $P_f$/Phd e=1.68 to 70% at $P_f/P_e$=6.72. Separation factors also increase with increasing dimensionless pressure ratio, thus the three components in the reaction are separated from the diluent to a greater degree at intermediate dimensionless pressure ratios. The increase in selectivity and separation performance plateaus at higher values of the dimensionless pressure ratio because the cycling frequency being employed is too slow for the large pressure difference being applied.

One measure of performance of the inventive system is the percent of a component recovered in a given stream. The effect of the delivery flow rate upon the percent recovery of each component in the delivery stream is presented in FIG. 5. There exists an upper operating limit on the delivery flow rate, above which the delivery flow rate can not be achieved for the operating parameters being employed. Although each of the three components in the reaction network are enriched in the delivery stream, recovery is usually less than 50% due to the large exhaust flow rates, hence the larger delivery cuts. Percent recoveries do not vary linearly with the delivery flow rate due to the drop in component enrichment at the larger delivery cuts. Total conversion and product selectivity were invariant over most of the range of delivery flow rate.

Figure 6:
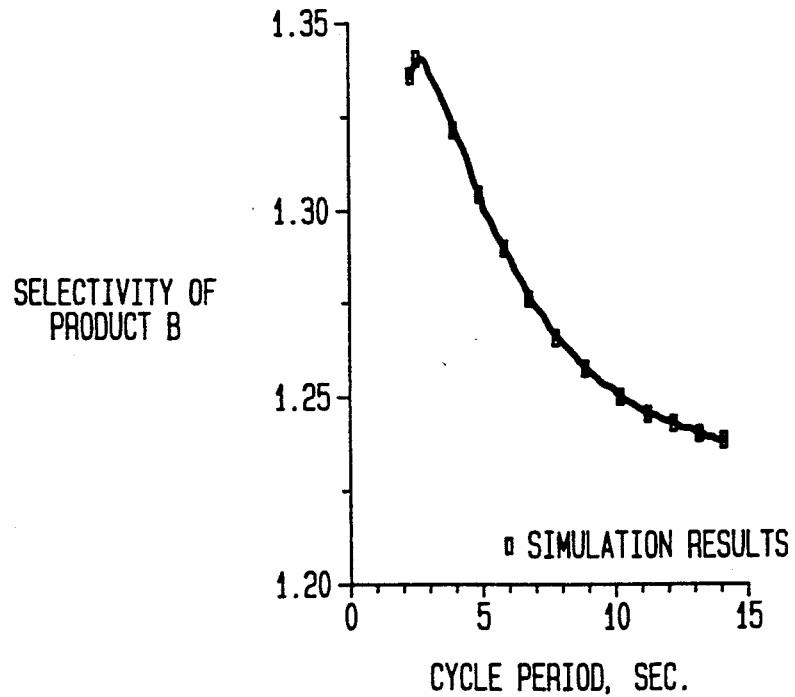
FIG. 6 is a graphical representation of the effect of cycle period on product B for the reversible B $\rightleftarrows$ A $\rightleftarrows$ C reaction.

The effect of the total cycle period upon the selectivity within a PSR is shown in FIG. 6. There exists a cycle period range within which the device may operate. This operating range arises due to the two limits upon the total cycle time. If the cycle period is too short, the bed attenuation is so great that the delivery flow rate cannot be realized. At the other end of the period range, long cycle times lead to long exhaust times and thus also result in a system incapable of sustaining a set delivery flow rate. Product B selectivity exhibits a local maximum between the operating range of periods. The location of the maximum occurs at the same frequency at which the separation performance exhibits a maximum. Conversion of the reactant remained invariant at approximately 67% over the operating frequency range.

Figure 7:
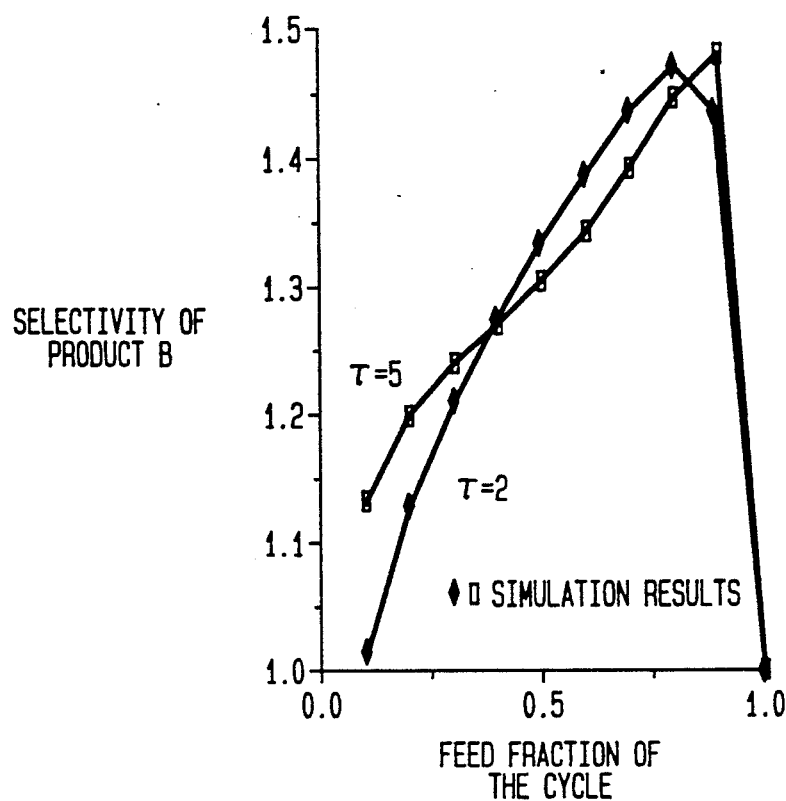
FIG. 7 is a graphical representation of the effect of cycle feed fraction and period on product B selectivity for the reversible B $\rightleftarrows$ A $\rightleftarrows$ C reaction.
Figure 8:
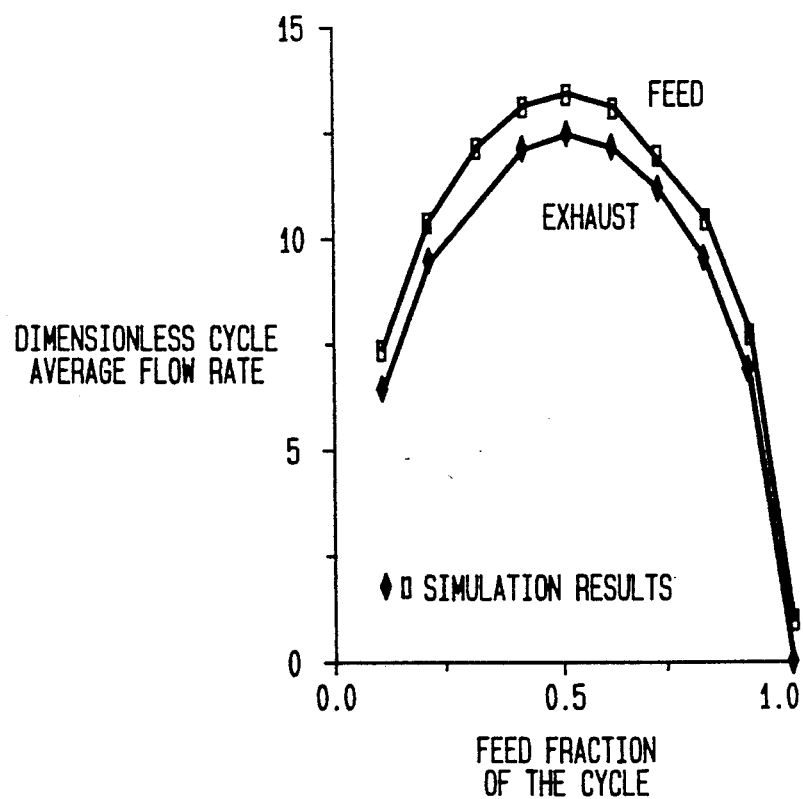
FIG. 8 is a graphical representation of the effect of the feed fraction of the cycle on dimensionless cycle average flowrates.

The effect of the fraction of the period that the feed is introduced into the PSR upon the selectivity and dimensionless cycle average flow rates is shown in FIGS. 7 and 8. Two limits on the operating feed fraction exist. If the feed fraction is too short, not enough gas is fed to the PSR to maintain the set delivery flow rate. At the other limit, a feed fraction of one is equivalent to steady-state plug flow operation with no exhaust stream and therefore no separation or selectivity enhancement is achievable.

The most unusual behavior exhibited, as the feed fraction is varied, is product B selectivity. The selectivity exhibits a local maximum which occurs at large values of the feed fraction. During the exhaust portion of the cycle, reaction rates for the reverse reaction of B to A are greatest due to the high concentration of B in the gas phase as it is released from the adsorbent. An excessive exhaust time would allow significant amounts of the product to convert back to the reactant A. Further, the effects of separation are weak, with separation factors varying less than five percent between a feed fraction of 0.1 and 0.9.

Figure 9:
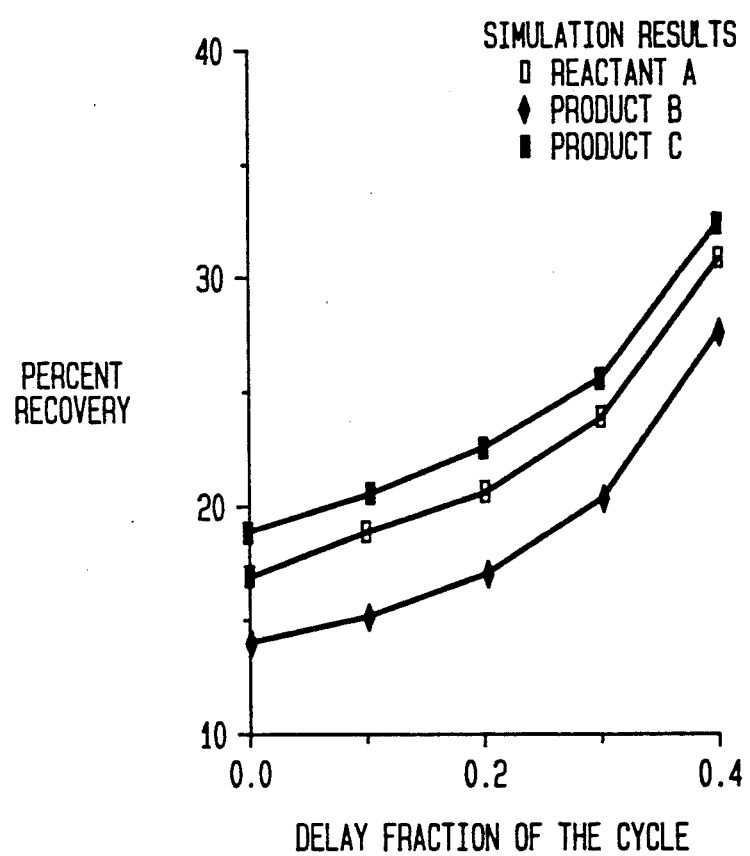
FIG. 9 is a graphical representation of the effect of cycle delay fraction on percent recoveries in the delivery stream for reversible B $\rightleftarrows$ A $\rightleftarrows$ C reaction.

The effect of the delay portion of the process cycle upon the recovery of the reaction components in the product stream is shown in FIG. 9. The exhaust fraction was kept constant at 0.5 throughout the series. The set delivery flow rate cannot be maintained when delay fractions are above 0.4 because of the corresponding small feed fraction (0.1). Although conversions and separations are basically invariant through the range of delivery fractions shown in FIG. 9, percent recovery of all three reaction components almost doubles.

EXAMPLE

CO Oxidation (A+½B→C)

Figure 10:
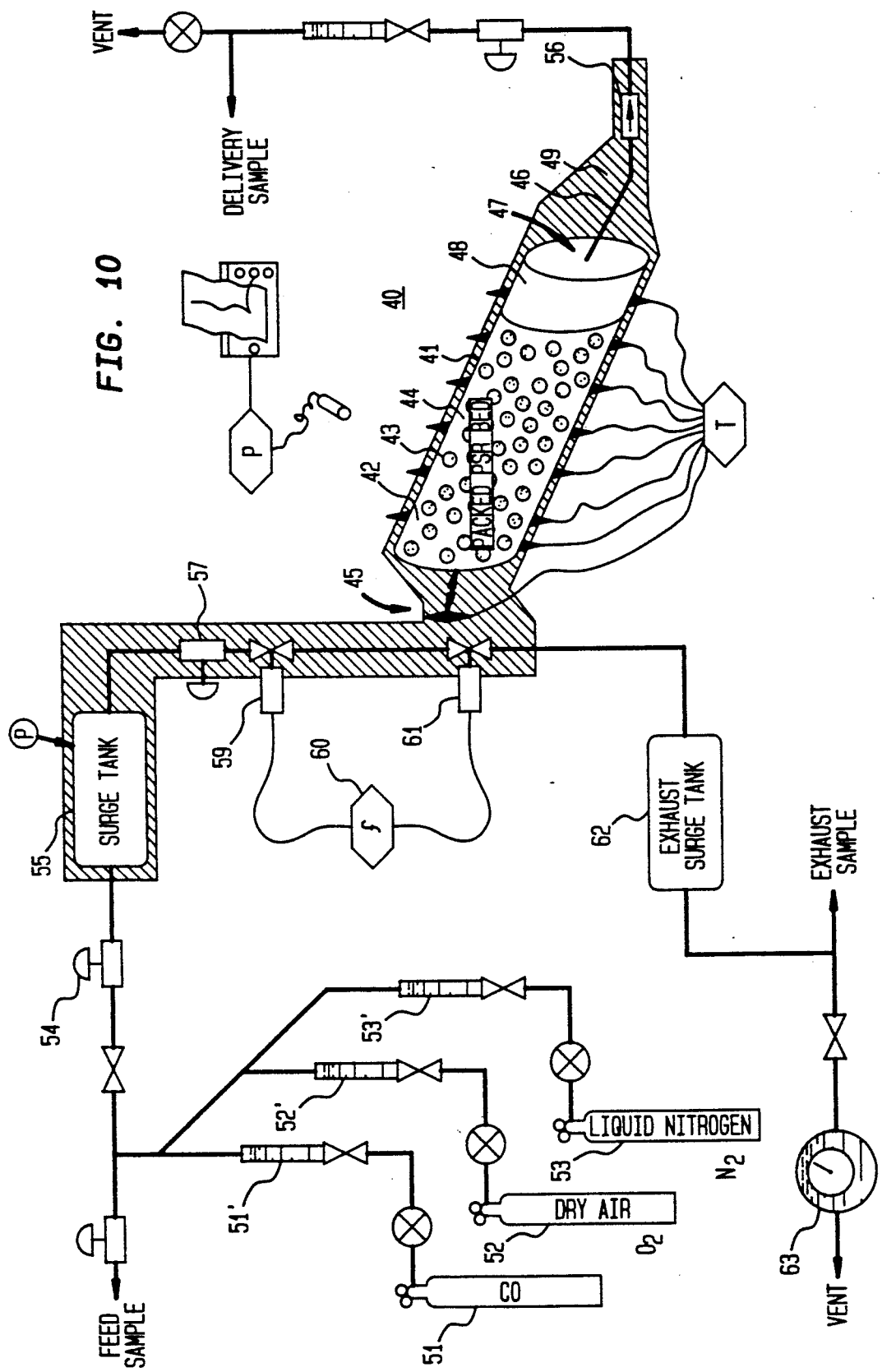
FIG. 10 is a schematic representation of an illustrative embodiment of a periodic separating reactor system of the present invention.

In a specific illustrative embodiment, a single bed rapid pressure swing adsorber is combined with a forced flow catalytic reactor as shown in FIG. 10. The periodic separating reactor 40 comprises column 41 containing a packing 42 of catalyst 43 and adsorbent 44. The gaseous reactants are pumped into the column 41 at end 45 under high pressure for a fraction of the operating cycle. The feed end may be dead-ended for a short time before being allowed to exhaust during the rest of the cycle. Due to the low permeability of packing 42, a continuous delivery stream 46 is removed at the opposite end 47 of the column. A void volume 48 is placed between the reaction bed and the delivery stream 46 to allow for reflux and perhaps higher product purity. After a start-up period consisting of many cycles, a stationary (repetitive) cyclic-steady-state is reached, with periodically varying pressure and composition existing in the bed. The chemical conversion and separation accomplished depend upon the manner in which the pressure and reactant concentrations are controlled at the feed boundary.

While other types of pressure and reactant cycling, such as sinusoidal, triangular, and square-wave, are possible, bang-bang (or on-off) pressure control is described herein.

Closely related to the input pressure wave form is the method by which reactants are introduced. During the feed phase of a cycle, various concentration patterns may be employed. Two exemplary methods useful as control schemes are: 1) introduction of reactants by stages, and 2) introduction simultaneously as a simple mixture of reactants and diluent. The first method creates a PSR in which reactant concentration forcing and flow rate cycling are both imposed. Concentration cycling is not completely absent in the second method due to separation of the different reactants by the adsorbent.

The PSR device shown in FIG. 10 is a 157.5 cm long, 2.1 cm inside diameter plain carbon steel pipe packed with both platinum catalyst beads and Davison 5A molecular sieve. In order to eliminate the effects of pressure swing on the pellet effectiveness factor for various reaction kinetics, an "eggshell" catalyst was employed. The catalyst was 0.5% platinum by weight deposited on the surface of 0.348 ±0.33 mm, low density Θ alumina spherical beads (available from W. R. Grace, New York, N.Y.) in accordance with a method reported by Lee and Chris, Aris, *Catal. Rev. Sci. Eng.*, 27, p. 207 1985.

The PSR bed was prepared by packing the column with catalyst spheres (229.6 gm) and Davison 5A molecular sieve (143. 1gm). In a particularly advantageous embodiment, use of 34-48 mesh round adsorbent particles insures that the interstitial voids between catalyst beads would be completed filled and that attrition of the adsorbent particles would not be a problem. Advantageously employing catalyst beads and adsorbent of two different diameter sizes also prevents attrition of the packing during operation. Adsorbent material was packed flush with the top of the column. The bed was then mounted at an incline of about 35 degrees. This upward slope of the column eliminated the possibility of a void channel developing along the top of the bed.

Temperature control was achieved with an external heat source to create external heat control region 49. During the preparation of the adsorbent bed moisture from the air inevitably contaminates the molecular sieve. As known in the art, vacuum evacuation and purge gas stripping at high temperatures removes the adsorbed water.

An inert diluent gas can be used to mitigate effects due to exothermicity of a reaction. In this case, nitrogen is employed as the inert diluent. The reactant feed mixture was produced by blending gas sources 51–53: liquid nitrogen (53), CP grade CO (51), and dry air (52). Nitrogen concentrations in the feed mixture were always maintained at least at 90 mole %. Blending was accomplished at the regulated pressure of back pressure regulator 54. Rotameters 51'–53' allow for repeatability while actual concentration measurement was employed to characterize the feed mixture. Surge vessels 55 and 56 were used for both the inlet and outlet flow, respectively. The feed mixture passed through a 8.2 dm³ surge vessel 55, and the exhausts flowed through a 36.0 dm³ surge vessle 56 before flow measurement. Forward pressure regulator 57 between the feed surge tank 55 and the feed solenoid valve 58 sets the desired PSR feed pressure. All other flow resistances are kept to a minimum. Solenoid valves 59 and 61 have a 6.35 mm internal orifice, which presents very little resistance to flow. The only other obstacle to flow between the PSR feed pressure regulator and the packed bed was one thickness of 80 mesh screen (not shown) used to support the adsorbent catalyst blend 42.

The desired cyclic pressure wave form as shown in FIG. 2 was physically created with two high temperature 2-way Valcor SV-62 series solenoid valves (59 and 61) using the following cycling sequence: (1) feed valve 59 open, exhaust valve 61 closed, (2) both valves 59 and 61 closed, and (3) feed valve 59 closed, exhaust valve 61 open. Valves 59 and 61 are electrically controlled by a circuit 60 consisting of two programmable timer relays, such as an Antex Electronics PET 1481 delay on operate and a Manetecraft W222 ACPFX-11 on/off square wave.

To achieve the desired feed boundary pressure control, the closing of the exhaust valve 61 preferably coincides with the opening of the feed valve 59. If both valves are open simultaneously, gas will bypass the column and flow directly from the feed to the exhaust.

Reference should be made to the mathematical model of the reaction-rate limited periodic separating reactor presented hereinabove for the applicable state equations and assumptions. The rate law for a periodic heterogeneous catalyzed reaction for CO oxidation has been given by Hegedus et al. AIChE J., 23, p. 632 (1977), $$r = \frac{\left(\frac{a K_1}{T} \exp(-E/R_g T)\right) P_{CO} P_{O_2}}{[1 + (K_2 \exp(H/R_g T)) P_{CO}]^2} \quad (22)$$

where the local Pt surface area for the egg-shell catalyst is determined from an equation presented by Oh et al. AIChE J., 26 p., 935 (1980), $$a = 2.6 \times 10^6 \left(\frac{\Delta^3}{\Delta^3 - \delta^3}\right)\left(\frac{\text{disp. \%}}{100}\right)\left(\frac{\text{wt. \%}}{100}\right) \quad (23)$$

Table 4 gives the key to notations and symbols used herein.

TABLE 4

| | Notation |
|---|---|
| a | Accessible Platinum surface area density, $cm^2$ Pt/gm cat. |
| E | Activation energy, cal./mole. |
| H | Heat of carbon monoxide adsorption over platinum, cal./mole |
| $K_1$ | Kinetic pre-expotential, moles °K./$cm^2$ Pt sec $atm^2$. |
| $K_2$ | Pre-expotential of the carbon monoxide adsorption term, 1/atm. |
| P | Pressure, atm. |
| $R_g$ | Ideal gas constant, cal/mole °K. |
| r | Intrinsic rate constant, mole/gm cat. sec. |
| T | Absolute temperature, °K. |
| Greek Letters | |
| γ | Apparent bed capacity constant, mg moles/atm. |
| Δ | Catalyst support radius, cm. |
| δ | Inner radius of the egg shell catalyst penetration, cm. |
| Subscripts | |
| CO | Refers to carbon monoxide. |
| CO2 | Refers to carbon dioxide. |
| N2 | Refers to nitrogen. |
| O2 | Refers to oxygen. |

The resulting reaction-rate limited model contains four second order, nonlinear, coupled, partial differential equations. The boundary conditions are time and state dependent, and include ordinary differential equations. Dimensional analysis clarifies the interactions between several variables. Most of the dimensionless groups for the CO oxidation system are the same as found in Table 2. The remaining two arise as a result of the form of the oxidation rate law (Eqn. 22). The first is that employed for an irreversible second order reaction, while the second is due to the inhibition term. The dimensional analysis results discussed previously, for all variables except the feed pressure for irreversible reactions, still apply.

Table 5 represents the physical parameters for the CO oxidation example herein. Many parameters affect the cyclic separation and conversion of the carbon monoxide, oxygen, nitrogen feed mixture. Of these only the column configuration, catalyst, and the minimum exhaust pressure have remained invariant in the example given herein. The type and size of molecular sieve, the length of the delay and exhaust portions of the cycle, and the PSR temperature also remained fixed.

TABLE 5

Physical Characteristics of the Periodic Separating Reactor

| | |
|---|---|
| Cross sectional area, | 3.45 $cm^2$ |
| Reflux void volume, | 50. $cm^2$ |

TABLE 5-continued

Physical Characteristics of the Periodic Separating Reactor

| | |
|---|---|
| Packed bed length, | 157.5 cm |
| Packed bed permeability, | 48.6 darcy |
| Gas viscosity, | ~0.0228 cp. |
| Mass of catalyst, | 229.6 gm |
| Δ, | 0.174 mm |
| δ, | 0.163 mm |
| Platinum | 0.5 wt. % |
| Pt dispersion, | 13.7% |
| a, | 10,040. $cm^2$ Pt/gm cat. |
| $K_1$, | $1.485 \times 10^8$ mole °K./$cm^2$ Pt sec $atm^2$ |
| $K_2$, | 5,484.5 1/atm. |
| E, | 15,000. cal/mole |
| H, | 2,000. cal/mole |
| Mass of absorbent | 143.1 gm. |
| $\gamma_{CO}$ | 120 mg mole/atm. |
| $\gamma_{O2}$ | 20 mg mole/atm. |
| $\gamma_{CO2}$ | 780 mg mole/atm. |
| $\gamma_{N2}$ | 31 mg mole/atm. |

Base case operating parameters values are presented in Table 6.

TABLE 6

Base Case Operating Parameter Corresponding to the Various Experiments.

| Figure → | 4, 5, 6, 7 | 8, 9, 10, 11 | 12, 13 | 14, 15, 16 | Control Error |
|---|---|---|---|---|---|
| Feed Pressure (atm) | 1.680 | 1.680 | 1.680 | 1.680 & 2.707 | ±0.07 |
| Exhaust Pressure (atm) | 1.0 | 1.0 | 1.0 | 1.0 | |
| Feed Time (sec) | 0.53 | 0.63 | varied | 0.53 | ±0.01 |
| Delay Time (sec) | 1.47 | 1.50 | 1.47 | 1.47 | |
| Exhaust Time (sec) | 2.93 | 2.93 | 2.87 | 2.93 | |
| Feed Oxygen (volume %) | varied | 1.15 | 2.67 | 2.67 | ±0.08 |
| Feed CO (volume %) Balance Nitrogen | 1.60 | varied | 1.60 | 1.60 | ±0.04 |
| Temperature (°F.) | 319. | 308. | 309. | 316 | ±5. |
| Delivery Flow Rate (SCFH) | 0.341 | 0.331 | varied | varied | ±0.008 |
| Delivery Cut (%) | 13.1 | 12.6 | 12.7 | varied | ±0.2 |

The effects of the percent oxygen in the feed, percent carbon monoxide in the feed, length of the feed portion of the cycle, the feed pressure, and the delivery flow rate are all illustrated in FIGS. 11–24.

The distinction among the interrelated terms separation factor, system throughput or capacity, delivery cut, recovery, extent of conversion, and production rate is essential for proper analysis of the performance of the PSR. The separation factor is defined as the ratio of the mole fractions for a component between the delivery and exhaust streams. Thus, for ratios above one, that component is enriched in the delivery stream. The system throughput or capacity is the cycle average flow rate (cc/sec) processed by the periodic separating reactor. The delivery cut is the fraction of the throughput which exits the PSR at the delivery stream. Recovery refers to the percent of the total amount of a component exiting the PSR which is recovered in a particular stream. The production rate is defined as the total mg moles/sec of carbon dioxide produced by the PSR, while the conversion is the percent of the feed carbon monoxide converted to $CO_2$.

Figure 11:
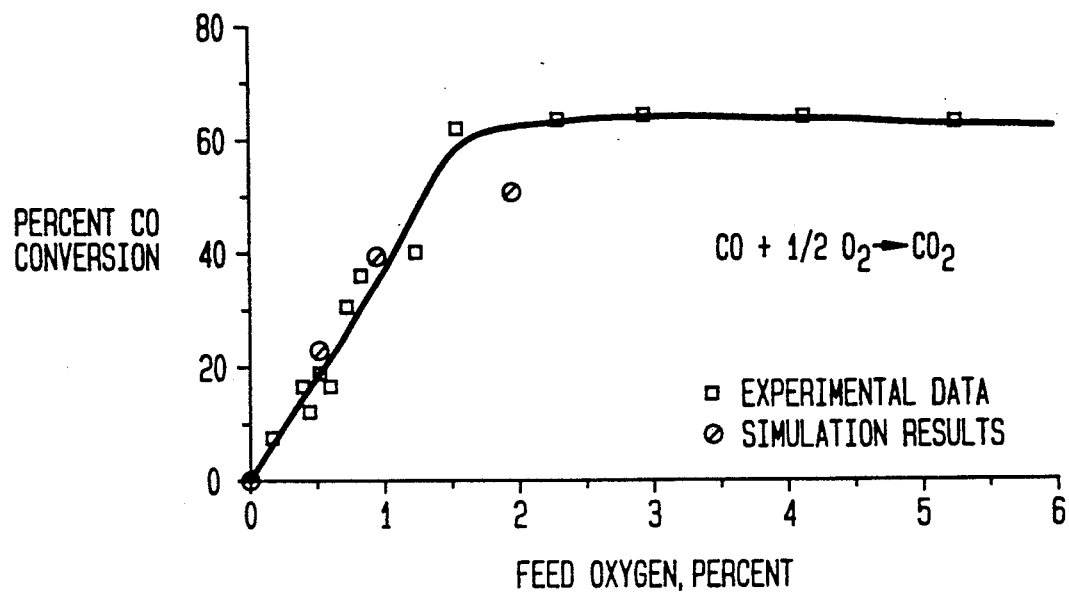
FIG. 11 is a graphical representation of the percent conversion of CO versus feed concentration of $O_2$ for the CO oxidation reaction in a PSR system.
Figure 12:
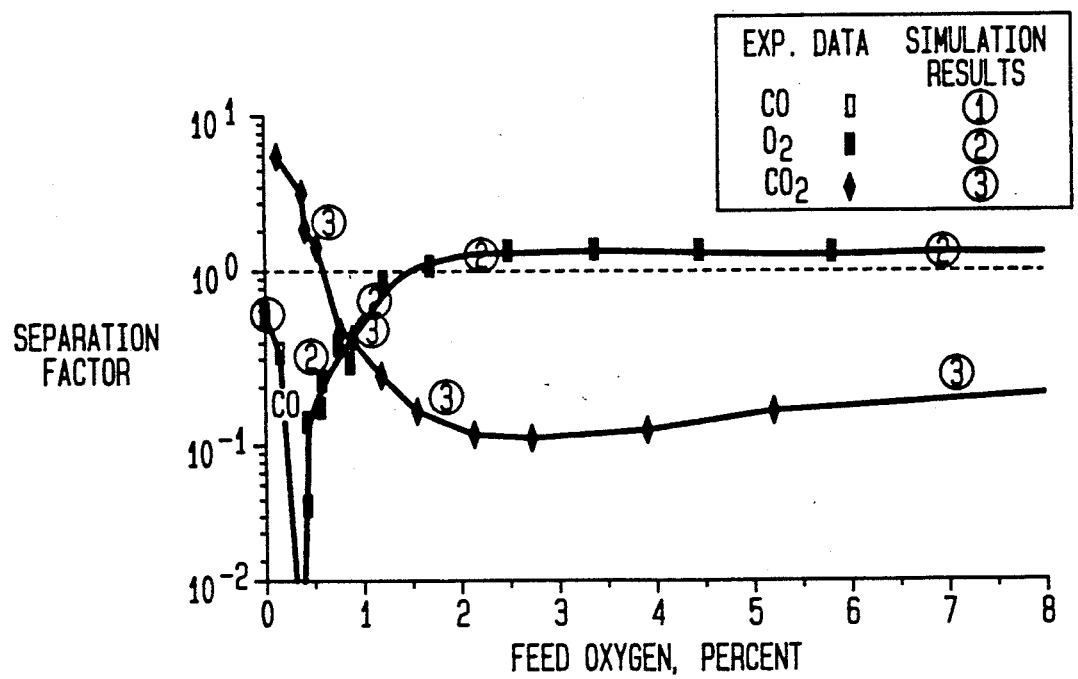
FIG. 12 is a graphical representation of the separation performance of a periodic separating reactor as a function of feed $O_2$ concentration for the CO oxidation reaction.

The effect of the percent oxygen in the feed upon the performance of the PSR is shown in FIGS. 11, 12, 13 and 14. As in an unforced reactor, as oxygen in the feed is increased, conversion increases (FIG. 11). The separation performance is shown in FIG. 12 as concentration of the feed oxygen is varied. At low feed oxygen concentrations, oxygen is enriched in the exhaust and oxygen concentrates in the delivery stream. Another feature is that the distribution of carbon monoxide in the two exit streams shifts further to the exhaust as more oxygen (i.e., more reaction) is introduced. At lower oxygen feed concentrations, only CO and carbon dioxide are present in the delivery stream, while at higher feed oxygen concentrations only carbon dioxide and oxygen are present in the delivery stream. All three reaction components are present in the exhaust stream over the entire range of feed oxygen concentrations greater than zero.

Figure 13:
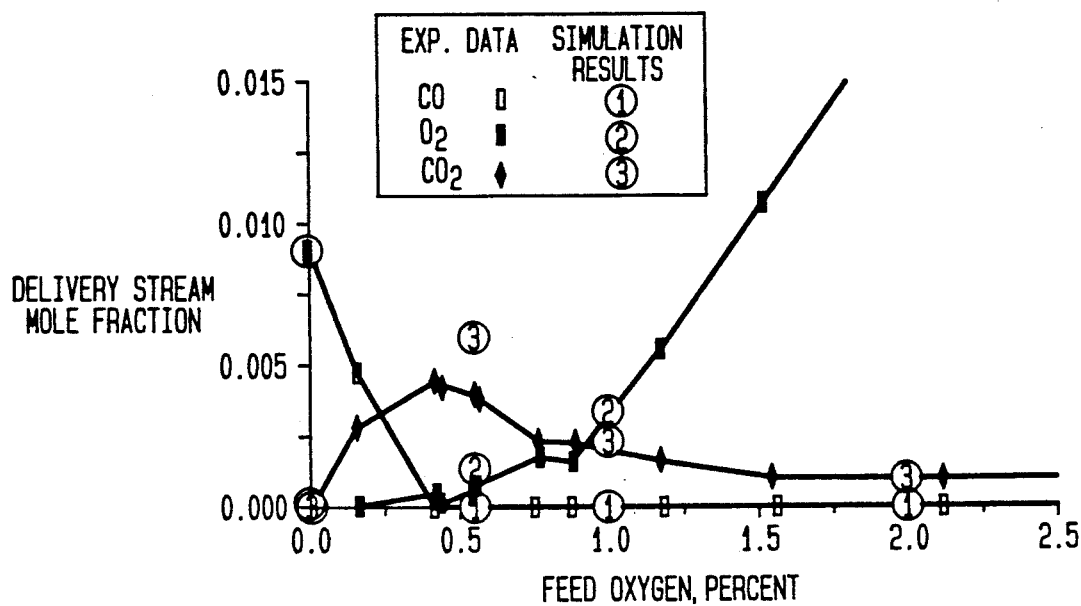
FIG. 13 is a graphical representation of the effect of feed $O_2$ concentration on delivery stream composition for the CO oxidation reaction in a PSR system.
Figure 14:
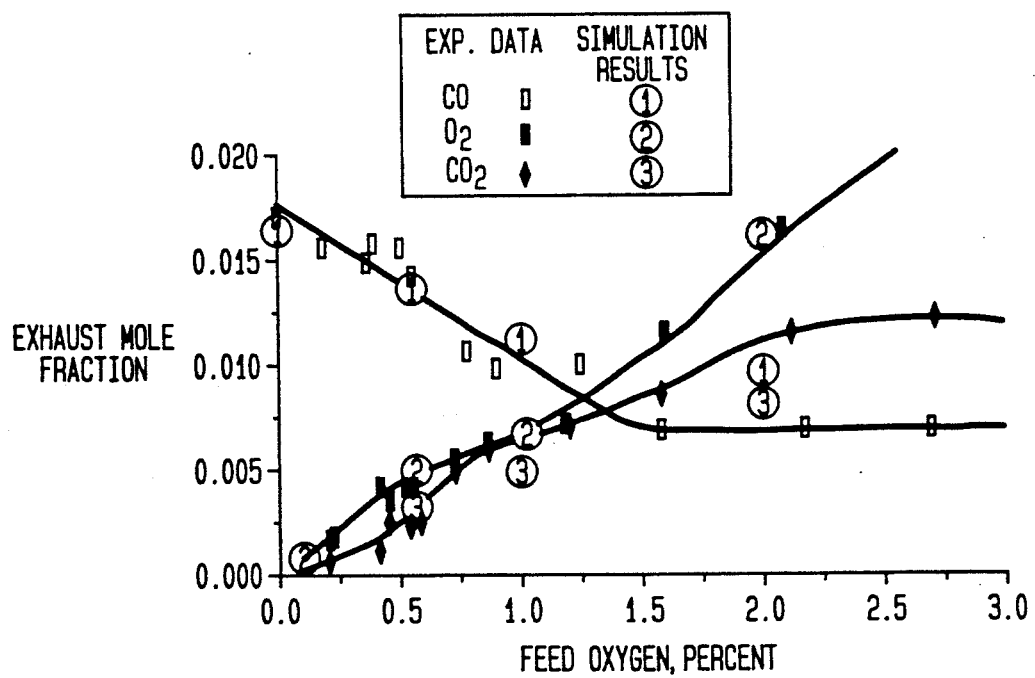
FIG. 14 is a graphical illustration of the effect of feed $O_2$ concentration on exhaust stream composition for the CO oxidation reaction in a PSR system.

An understanding of the coupling between the reaction and separation performance of the PSR is facilitated by examining the mole fractions for each reaction component in both of the exit streams as a function of the feed oxygen concentration as shown in FIGS. 13 and 14. At low values of feed oxygen, the conversion achieved is small, and although $CO_2$ is the most strongly adsorbed component, carbon dioxide enrichment occurs in the delivery stream. As the feed oxygen is increased, $CO_2$ concentration goes through a maximum in the delivery stream while always increasing in the exhaust. Coupled with this effect is the fact that the disappearance of CO from the delivery stream coincides with the maximum in $CO_2$ concentration. At oxygen feed concentrations greater than ~1.5%, both the total conversion and the $CO_2$ in both streams levels off.

For low conversions most of the $CO_2$ is produced near the delivery end of the PSR. At the feed oxygen concentration for which CO is no longer present in the delivery stream, a sharp reaction front develops at the delivery end of the packed bed. A reaction front is expected from the form of the rate law for CO oxidation on platinum (Eq. 22) due to the change from a positive reaction order at low carbon dioxide concentrations to negative reaction order at high CO concentrations. Even though the adsorption of $CO_2$ is very strong, the product formed very near the delivery stream cannot be completely drawn towards the exhaust stream, and thus is enriched in the delivery stream. As the feed oxygen concentration is increased further, the reaction front moves toward the feed end of the bed, thus the decrease in the $CO_2$ concentration in the delivery stream, and finally the separation reversal. At oxygen concentration above ~1.5%, the reaction front is within one tenth the total bed length from the feed end.

Figure 15:
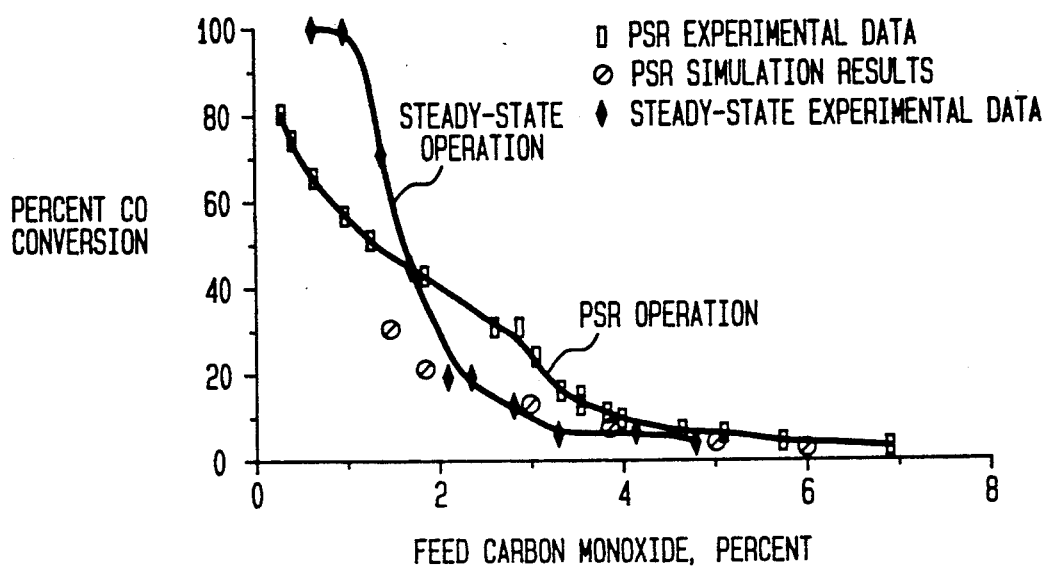
FIG. 15 is a graphical illustration of the percent conversion of CO versus feed CO concentration for both steady-state plug flow and PSR operation.

The effect of CO concentration in the feed stream on the PSR performance is shown in FIGS. 15, 16, 17, 18, and 19. Conversion within both steady-state and periodic separating reactors decreases with increasing concentration of inlet CO (FIG. 15). This behavior can be explained by the form of the rate equation (Eq. 22). As indicated earlier, "high" concentrations of CO lead to a negative reaction order in CO. The inlet concentration of CO at which the maximum in the steady-state oxidation rate occurs is independent of the feed oxygen and is simply equal to $(1/K_2 \exp(H/R_g T) = 1.76 \times 10^{-5}$ atm). For the operating temperature, this CO concentration is quite small; therefore for the majority of the range of feed CO concentration shown in FIG. 15, CO oxidation is inhibited by CO.

Figure 16:
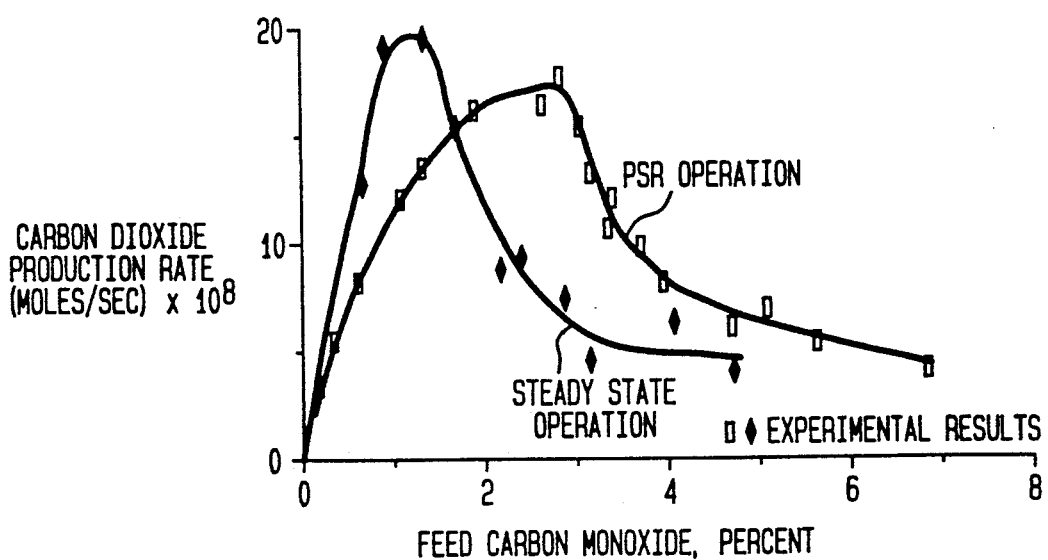
FIG. 16 is a graphical representation of the $CO_2$ production rate versus feed CO concentration for both steady-state plug flow and PSR operation.

A different way to examine the conversion data is to plot the carbon dioxide production rate as a function of the inlet carbon monoxide concentration (FIG. 16). Again two regions are evident. Although the production rate of $CO_2$ can be greater during steady-state plug-flow operation than PSR, the location of the maximums are different. The maximum in the $CO_2$ production rate for steady-state operation is narrower (compared to PSR operation) and occurs at an inlet mixture which is oxygen rich. On the other hand, the maximum for PSR operation is broader and is centered near the stoichiometric ratio for the feed mixture.

Figure 17:
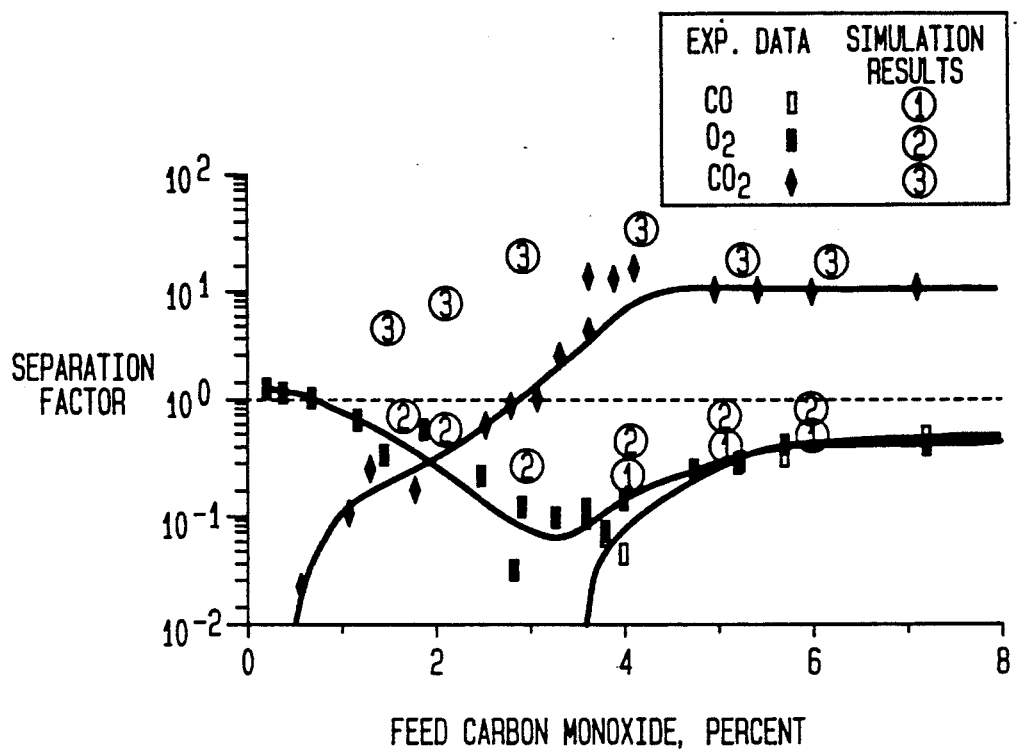
FIG. 17 is a graphical representation of the separation performance of a PSR system as a function of feed CO concentration for the CO oxidation reaction.

Another feature of the conversion-feed CO performance is the existence of two regions: one in which steady-state operation results in a greater conversion, and the other in which PSR conversion is greater. The difference in conversion performance can be understood after considering the separation performance of the PSR as a function of the feed CO concentration (FIG. 17). Separation reversals for oxygen and carbon dioxide are evident. Furthermore, three regions can be identified. The first at low CO feed concentration, where only oxygen is present in delivery stream. The second at intermediate CO feed concentrations, where both carbon dioxide and oxygen are present in the delivery stream. The third at higher feed CO concentrations, where all three reaction components are present in the delivery stream. All three reaction components are present in the exhaust stream for the entire range of feed CO concentrations greater than zero.

Figure 18:
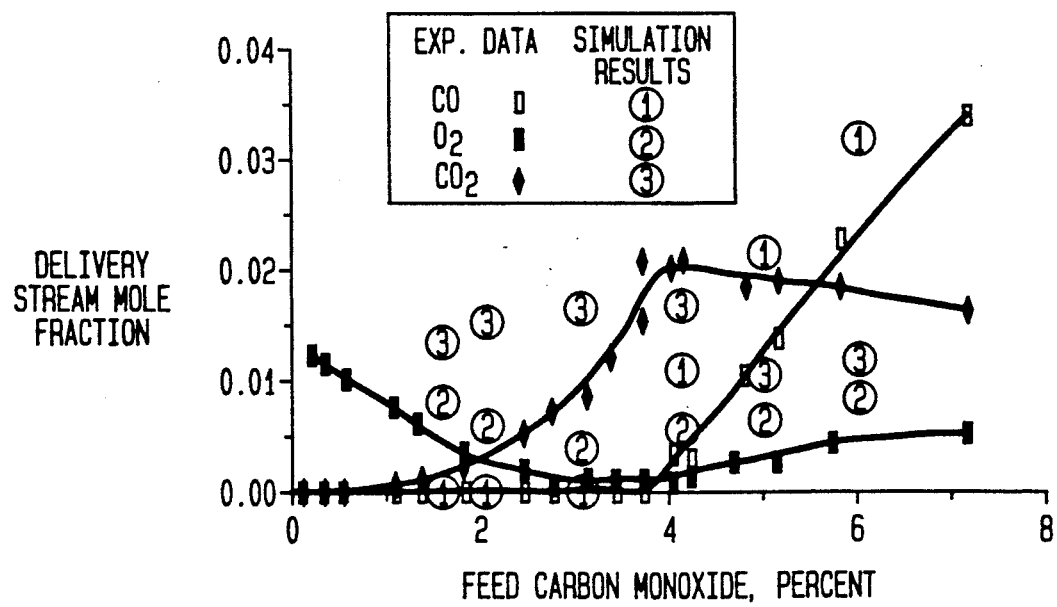
FIG. 18 is a graphical representation of the effect of feed CO concentration on delivery stream composition for PSR operation.
Figure 19:
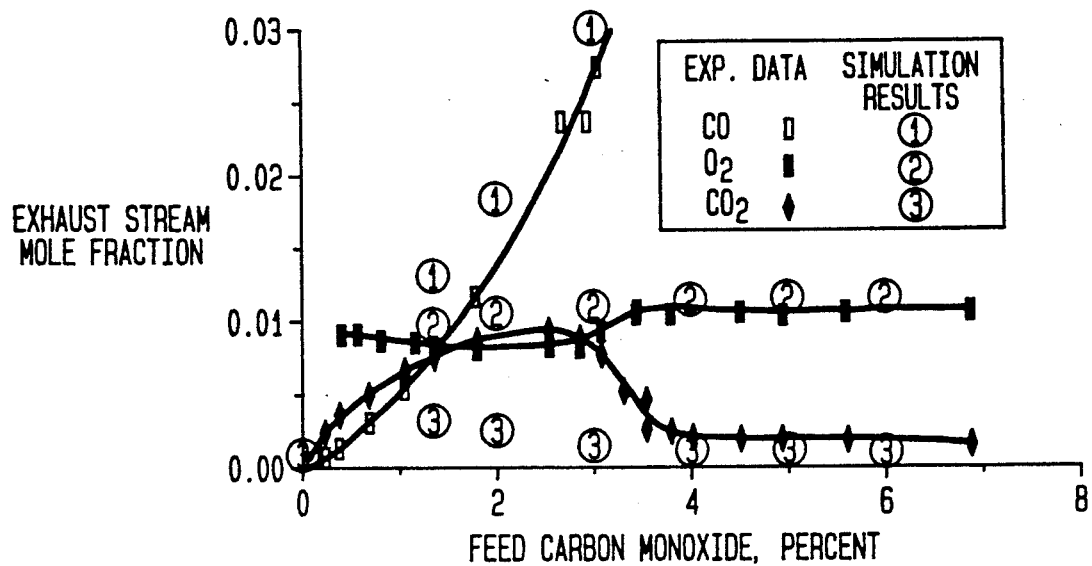
FIG. 19 is a graphical representation of the effect of feed CO concentration on exhaust stream composition for PSR operation.

PSR performance, as the feed CO concentration is varied, affects the mole fractions of the reaction components in both the delivery and exhaust streams (FIGS. 18 and 19). Once again the presence of a reaction front explains this result. At low feed concentrations of CO, the reaction front exists near the feed end of the packed bed, thus the $CO_2$ in the delivery stream increases while the $CO_2$ in the exhaust stream goes through a maximum. At a feed CO concentration of about 4.0% the reaction front reaches the delivery end of the bed. At higher feed CO concentrations the front "exits" the bed and thus CO is found in the delivery stream.

As already discussed, conversion decreases with increasing feed CO due to the inhibition effect of CO on the oxidation rate. The difference between the steady-state and PSR performance is due to three effects. Foremost are the effects of separation. At high (~1.6%) feed concentrations of CO, removal of excess CO in the exhaust stream results in greater oxidation rates throughout the rest of the PSR. The net result of such separation is greater conversions than are possible within a steady-state plug flow reactor. At lower feed CO concentrations, oxidation rates are already sufficient to result in high conversions and thus any removal of CO in the exhaust stream reduces the overall conversion.

The second phenomena which affects the oxidation rate in a PSR is caused by adsorption of the reactant. At cyclic-steady-state the cycle average CO fed to the PSR either reacts or exits the reactor. Local removal of CO from the gas phase by the adsorbent during the feed part of the cycle results in higher local oxidation rates because of the inhibition effect of the reactant. The subsequent desorption of CO slows the oxidation rate during the exhaust portion of the cycle. The opposing effects do not cancel because the CO lost to reaction during the feed portion of the cycle will not be present to inhibit the reaction during the exhaust portion of the cycle. The net effect is an increase in the overall local oxidation rate.

The third phenomena which also plays a role in the conversion-feed CO performance difference is residence time distribution. For a given level of conversion, the mean residence time of the steady-state plug flow reactor is independent of the feed CO concentration; however, for the PSR there is a dependence. Within a PSR, mean residence time can be altered by adsorption of the reactant. In this case, additional CO in the feed results in deeper penetration of the adsorption front for CO (even if conversion is not altered). In turn, the average residence time for CO is increased. Thus, as the inlet concentration of CO to the PSR is increased, the average residence time for the reactant increases. Therefore, for low CO inlet concentrations, the average residence time within the PSR will be less than that within the steady-state reactor, while at high CO concentrations the opposite situation exists. This mean residence time phenomena is further enhanced by the existence and position of the reaction front.

Figure 20:
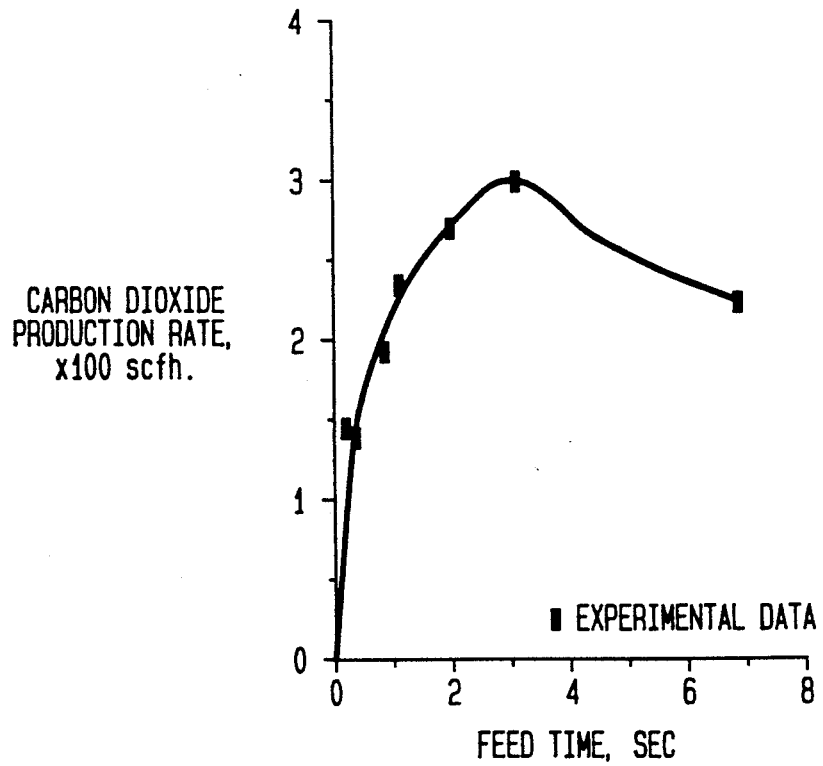
FIG. 20 is a graphical representation of the production rate of $CO_2$ versus duration of high pressure feed time for CO oxidation under PSR operation.

The production rate of carbon dioxide as a function of the feed portion of the process cycle is shown in FIG. 20. Note that the length of the delay and exhaust portions of the process cycle have been kept constant. A production rate maximum exists for two reasons. First, the cycle average flow rate response to the feed time is parabolic with a maximum near 3.5 seconds for the feed portion of the cycle. The conversion-feed time performance increases as the feed time is increased and plateaus at 65% by 2.5 seconds feed time, thus the production maximum is at three seconds.

Figure 21:
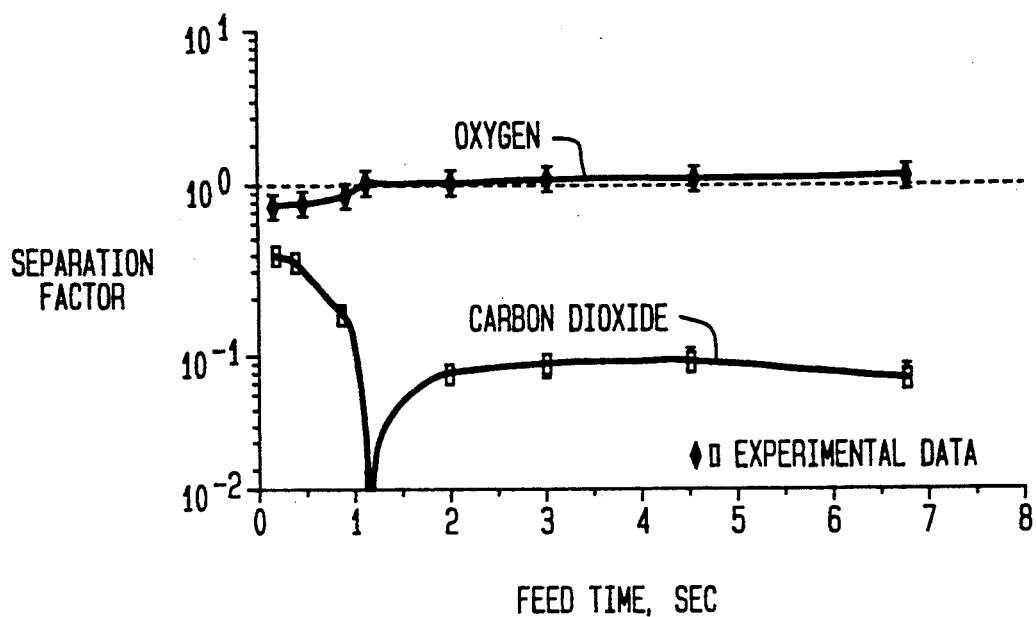
FIG. 21 is a graphical representation of separation performance as a function of duration of high pressure feed time for CO oxidation under PSR operation.

The separation performance for the PSR is shown in FIG. 21 as a function of the length of the feed portion of the cycle. The separation performance of carbon dioxide traverses a maximum at slightly greater than one second, while oxygen undergoes a separation reversal. Carbon monoxide was detected only in the exhaust stream. This behavior is the result of poor separation performance at lower feed time lengths coupled with the movement of the reaction front. At feed times greater than three seconds very little additional feed gas is introduced into the system, and thus, constant separations are achieved.

Figure 22:
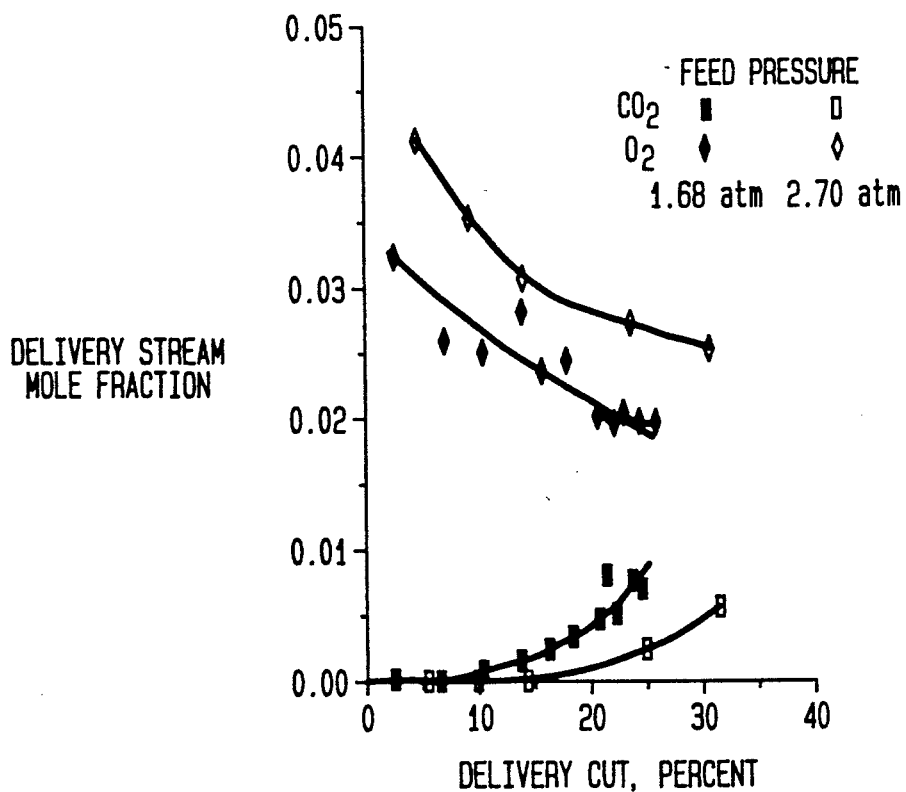
FIG. 22 is a graphical representation of delivery stream composition as a function of delivery cut and feed pressure for CO oxidation under PSR operation.

The effect of the delivery cut upon the delivery mole fractions was examined at two feed pressures (FIG. 22). An upper limit exists on the delivery cut which can be obtained while maintaining a constant delivery stream flow rate. Understandably, higher delivery cuts are possible at higher feed pressures. Oxygen concentration in the delivery stream decreases as the delivery cut is increased. This result is due to the separation performance of the PSR alone, as the conversion achieved in the PSR remained constant at ~58% throughout the experimental series. Although CO was not detected in the delivery stream as the delivery cut was valid, breakthrough of $CO_2$ was seen. The breakthrough of $CO_2$ occurs at a higher delivery cut at the higher feed pressure. In this case, the behavior is a result of both separation and reaction performance. At higher delivery cuts, the reaction front is situated closer to the delivery stream. Coupled with the poorer separation achieved at the higher delivery cuts, $CO_2$ breakthrough is observed.

Figure 23:
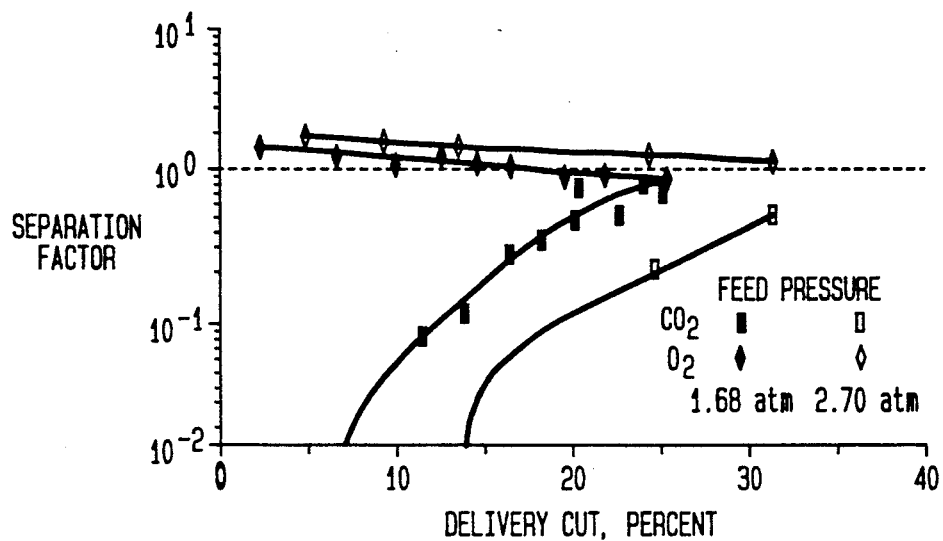
FIG. 23 is a graphical representation of delivery cut and feed pressure on component separation factors for CO oxidation under PSR operation.

The corresponding separation performance of the PSR system for the delivery cut series is shown in FIG. 23. Oxygen is observed to undergo separation reversal (for the low feed pressure series), while the $CO_2$ breakthrough is evident. As would be expected from PSA theory, a higher degree of separation is achieved at lower delivery cuts and at the higher pressure. The increased separation performance at the higher pressure accounts for the pressure effects in FIG. 22.

Figure 24:
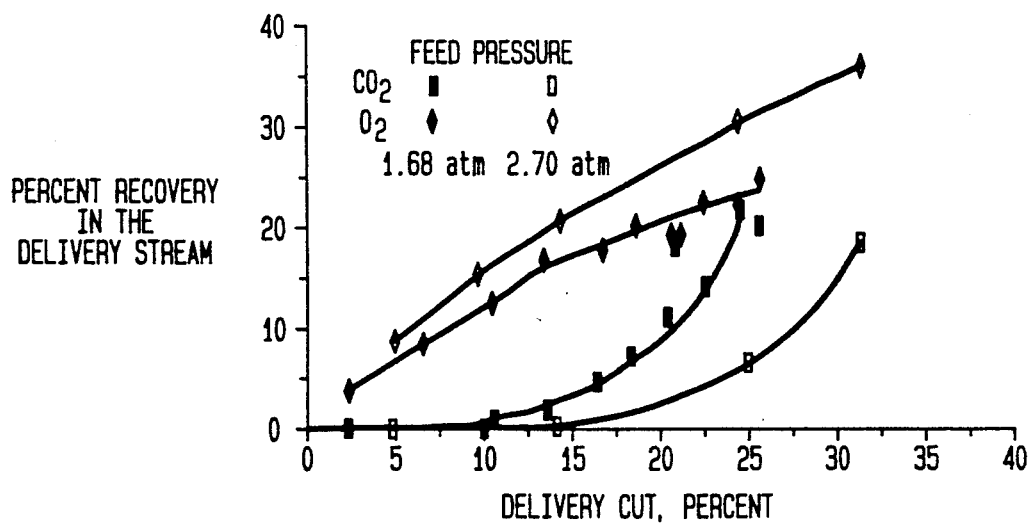
FIG. 24 is a graphical representation of delivery cut and feed pressure on delivery stream recoveries for CO oxidation under PSR operation.

The effect of the delivery cut upon the recovery of each component in the delivery stream is shown in FIG. 24. Carbon monoxide was not detected in the delivery stream and thus was 100% recovered in the exhaust. The enhanced separation at the higher feed pressure and the breakthrough of $CO_2$ are both evident. The recovery of oxygen and carbon dioxide is seen to increase with increasing delivery cut. Higher oxygen recoveries are possible at the higher feed pressure, and the level of $O_2$ recovery at which $CO_2$ breakthrough occurs is greater. At a feed pressure of 1.68 atm only 10% oxygen recovery is possible before $CO_2$ is detected in the delivery stream, while at the higher feed pressure of 2.70 atm up to 20% oxygen recovery can be obtained before carbon dioxide breakthrough.

The separating reactor was designed to provide separation with very limited reaction at room temperature. With no catalyst present or at very low temperatures, no conversion is achieved, and thus the PSR operates as RPSA with the separation of the reactants from the diluent. At the other limit, very high catalyst loadings or high temperatures result in the equilibrium conversion of CO upon being fed to the PSR. The reaction front phenomenon is observed near the delivery end of the bed at low catalyst loadings or low temperatures, and moves towards the feed end as catalyst loading or PSR temperature is increased. The effect of these parameters upon the separation component of PSR is not the same. Whereas catalyst loading has no effect upon the absorbent capacity, higher temperatures reduce the capacity of the adsorbent.

While the specific embodiment described in detail herein was directed to a two reactant CO oxidation process for automobile pollution control, the invention is applicable to any number of reactant gases. Illustratively, other combustible automotive emission gases, such as methane, could have been included as a reactant in the feed. Another illustrative example wherein the present invention would find applicability is the synthesis of ammonia.

The principles of the invention can be applied to tailor the hybrid processor to a myriad of gas phase chemical reaction processes wherein separation of products and/or reactants is desirable. To name a few examples, the invention could find applicability in the petroleum refining industry, in the production of petrochemical-based synthetic materials, in pollution control, and fertilizer production. The modelling scheme proposed herein may be used to calculate the device and process parameters for any individual situation.

Although the invention has been described in terms of specific embodiments and applications, persons skilled in the art can, in light of this teaching, generate additional embodiments without exceeding the scope of departing from the spirit of the claimed invention. Accordingly, it is to be understood that the drawing and description in this disclosure are proffered to facilitate comprehension of the invention, and should not be construed to limit the scope thereof.

What is claimed is:

1. A pressure-periodic process for reacting and separating gaseous components, the process comprising the steps of:
   (a) introducing into a single bed chemical processing unit at a first pressure and in a first direction of flow, a multicomponent feed gas for forming both a reaction product and an adsorption product during a pressurization portion of a pressure cycle, said single bed chemical processing unit having an adsorption zone and a reaction zone arranged in series with each other with respect to said first direction of flow, said reaction zone being located downstream from said adsorption zone, a first end adjacent said adsorption zone having a first input having open and closed states for controlling the introduction of the multicomponent feed gas and a first output having open and closed states, and a second end downstream from said adsorption zone having a second output, said first input being in said open state and said first output being in said closed state during said step of introducing;

(b) permitting adsorption of a component of the multicomponent feed gas in the adsorption zone, and reaction between at least two components of the multicomponent feed gas to produce the reaction product in the reaction zone, said adsorbed component of the feed gas being the adsorption product, said first output being in a closed state during at least a portion of this step;

(c) continuously withdrawing at a second pressure, which is a residual pressure lower than said first pressure, the reaction product from the second output in the first direction of flow, said first output being in closed then open states during successive portions of this step;

(d) terminating step (a) by placing said first input in said closed state, said first input remaining in a closed state for a period of time after performing said present step of terminating, and said first output being in a closed state during performance said present step of terminating; and (e) exhausting at a third pressure, by placing said first output in said open state, and desorbing said adsorption product through said first output, said adsorption product being said previously adsorbed component of the multicomponent feed gas, before the pressure equalizes from the first end to the second end and after a delay after initiating step (d), said third pressure being a residual pressure which is sufficiently low to permit said previously adsorbed component to be desorbed, whereby the flow of said adsorption product is in a direction within said single bed chemical processing unit contrary to the first direction of flow, said first output remaining in a closed state substantially throughout the duration of step (b).

2. The method of claim 1 wherein there is provided a catalyst in the reaction zone of the single bed chemical processing unit for facilitating the reaction between the two components of the multicomponent feed gas.

3. A pressure-periodic process for reacting and separating gaseous components, the process comprising the steps of:

(a) introducing into a single bed chemical processing unit at a first pressure and in a first direction of flow, a multicomponent feed gas for forming both a reaction product and an adsorption product during a pressurization portion of a pressure cycle, said single bed chemical processing unit having a reaction zone and an adsorption zone arranged in series with each other with respect to said first direction of flow, said adsorption zone being located downstream from said reaction zone, a first end adjacent said reaction zone having a first input having open and closed states for controlling the introduction of the multicomponent feed gas a first output having open and closed states, and a second end downstream from said reaction zone having a second output, said second output having open and closed states, said first input being in said open state, and said second output being in said closed state, during said present step of introducing;

(b) permitting reaction between at least two components of the multicomponent feed gas to produce the reaction product in the reaction zone and adsorption of a component of the feed gas, said adsorbed component of the feed gas being the adsorption product in the adsorption zone, said second output being in a closed state during at least a portion of said present step of permitting reaction;

(c) continuously withdrawing at a second pressure, which is a residual pressure lower than said first pressure, the reaction product from the first output in a second direction of flow within the single bed chemical processing unit, said second output being in closed and open states during respective portions of said present step of continuously withdrawing;

(d) terminating step (a) by placing said first input in said closed state, said second output being in a closed state during performance said present step of terminating; and (e) exhausting at a third pressure, by placing said second output in said open state, the adsorption product at the second end of the single bed chemical processing unit, before the pressure equalizes from the first end to the second end and after a delay after initiating step (d), said third pressure being a residual pressure, whereby the flow of said adsorption product is in the first direction of flow, said first output remaining in a closed state substantially throughout the duration of step (b).

* * * * *